US012374073B1

(12) United States Patent
Robinson et al.

(10) Patent No.: US 12,374,073 B1
(45) Date of Patent: Jul. 29, 2025

(54) METHOD AND APPARATUS FOR MULTI-MODAL FUSION OF SPATIAL-TEMPORAL DATA

(71) Applicant: Northeastern University, Boston, MA (US)

(72) Inventors: Cordula A. Robinson, Boxborough, MA (US); Marco Franco, Cumberland, RI (US); Alexander S. Tapley, Wolcott, CT (US)

(73) Assignee: Northeastern University, Boston, MA (US)

( * ) Notice: Subject to any disclaimer, the term of this patent is extended or adjusted under 35 U.S.C. 154(b) by 519 days.

(21) Appl. No.: 17/709,279

(22) Filed: Mar. 30, 2022

Related U.S. Application Data

(60) Provisional application No. 63/214,579, filed on Jun. 24, 2021, provisional application No. 63/169,205, filed on Mar. 31, 2021.

(51) Int. Cl.
*G06V 10/80* (2022.01)
*G06V 10/25* (2022.01)
*G06V 10/77* (2022.01)
*G06V 10/82* (2022.01)
*G06V 20/00* (2022.01)

(52) U.S. Cl.
CPC .......... *G06V 10/25* (2022.01); *G06V 10/7715* (2022.01); *G06V 10/803* (2022.01); *G06V 10/82* (2022.01); *G06V 20/35* (2022.01)

(58) Field of Classification Search
CPC .... G06V 10/25; G06V 10/7715; G06V 10/80; G06V 10/82

USPC ................................................ 382/174, 156
See application file for complete search history.

(56) References Cited

U.S. PATENT DOCUMENTS

| 2016/0328827 | A1* | 11/2016 | Ilic | G06T 3/4038 |
| 2018/0314253 | A1* | 11/2018 | Mercep | G06V 10/803 |
| 2021/0150227 | A1* | 5/2021 | Hu | G06V 20/64 |

OTHER PUBLICATIONS

Atrey, et al. "Multimodal Fusion for Multimedia Analysis: a Survey," Multimedia Systems, vol. 16, No. 6, 2010, pp. 345-379.

(Continued)

*Primary Examiner* — Jamares Q Washington
(74) *Attorney, Agent, or Firm* — Hamilton, Brook, Smith & Reynolds, P.C.

(57) ABSTRACT

A computer-implemented method, and corresponding system, predicts existence of a feature in a scene within an environment for each of at least two modes of observation, e.g., thermal, video color, or multispectral imaging, of the scene. Predicting the existence includes calculating a proposal of the existence of the feature within a respective bounded region of a representation of the scene for each of the at least two modes of each observation of a sequence of observations. The method uses a projection function that synergistically shares information between or among the at least two modes to generate a corresponding fused predicted existence of the feature for each of the at least two modes of each observation, thereby maximizing the benefits of multi-modality. The feature may be an object of interest that may be occluded and moving within the environment. The predicted existence enables the object to be detected, tracked, and/or identified.

24 Claims, 28 Drawing Sheets
(18 of 28 Drawing Sheet(s) Filed in Color)

(56) References Cited

OTHER PUBLICATIONS

Bahdanau, et al., (2014). "Neural machine translation by jointly learning to align and translate," in Proc. Int. Conf. Learn. Representations.

Baltrusaitis, et al. (2019). "Multimodal Machine Learning: A Survey and Taxonomy." IEEE Transactions on Pattern Analysis and Machine Intelligence, vol. 41, No. 2, pp. 423-443.

Chalapathy, et al., (2019). "Deep Learning for Anomaly Detection: A Survey," ArXiv.org, Jan. 23 Retrieved from arxiv.org/abs/1901.03407.

Cho H., et al., (2014), "A multi-sensor fusion system for moving object detection and tracking in urban driving environments," Proceedings of the 4 IEEE International Conference on Robotics and Automation (ICRA); Hong Kong, China. May 31-Jun. 7, 2014; pp. 1836-1843.

Feng, D., et al., (2020), "Deep Multi-modal Object Detection and Semantic Segmentation for Autonomous Driving: Datasets, Methods, and Challenges," Retrieved from https://arxiv.org/abs/1902.07830.

Himmelsbach, M., et al., (2008). "LIDAR-based 3D Object Perception," Velodyne Lidar, p. 1-7.

Hu, et al., "Nonlinear Dictionary Learning with Application to Image Classification," Pattern Recognition, vol. 75, 2018, pp. 282-291.

Jiang, Y., et al. (2017). "Multimodal Image Alignment via Linear Mapping between Feature Modalities," Journal of Healthcare Engineering, vol. 2017, pp. 1-6.

James, et al., (2014). "Medical image fusion: A survey of the state of the art," Inform. Fusion, vol. 19, pp. 4-19.

Lan, et al., (2014). "Multimedia classification and event detection using double fusion," Multimedia Tools Appl., vol. 71, pp. 333-347.

Lin, et al., "Microsfor COCO: Common Objects in Context," Feb. 21, 2015, retrieved from arXiv: 1405.0312v3.

Lin, et al., (2018). "Focal Loss for Dense Object Detection," May 10, retrieved from arxiv.org/abs/1708.02002.

Moeslund, et al., "A Survey of Computer Vision-Based Human Motion Capture," University of Aalborg, Mar. 1999, 81 (3).

Morvant, E., et a.,l (2014). "Majority vote of diverse classifiers for late fusion," in Lecture Notes in Computer Science Description. Berlin, Germany: Springer.

Potamianos, G., et al., (2003). "Recent advances in the automatic recognition of audio-visual speech," Proc. IEEE, vol. 91, No. 9, pp. 1306-1326.

Qu, Y., et al., (2017). "Active Multimodal Sensor System for Target Recognition and Tracking," Sensors (Basel, Switzerland), 17(7), 1518.

Redmon, J., et al., (2016). "You Only Look Once: Unified, Real-Time Object Detection," Retrieved from https://arxiv.org/abs/1506.02640.

Ren, S., et al., (2016). "Faster R-CNN: Towards Real-Time Object Detection with Region Proposal Networks," Retrieved from https://arxiv.org/abs/1506.01497.

Russakovsky, et al., "ImageNet Large Scale Visual Recognition Challenge," Jan. 30, 2015, Retrieved from arXiv: 1409.0575v3.

Shen, et al., (2014). "Multi-modal and multispectral registration for natural images," in European Conference on Computer Vision, pp. 309-324, Springer.

Shutova, E., et al., (2016). "Black holes and white rabbits: Metaphor identification with visual features," in Proc. Conf. North Amer. Chapter Assoc. Comput. Linguistics: Human Language Technol., 2016, pp. 160-170.

Wagner, J., et al., (2016). "Multispectral Pedestrian Detection using Deep Fusion Convolutional Neural Networks," Retrieved from http://ais.uni-bonn.de/papers/ESANN_2016_Wagner.pdf.

Wu, Z., et al., (2006). "Multi-level fusion of audio and visual features for speaker identification," In: International Conference on Advances in Biometrics, pp. 493-499.

Yu J., et al., (2004). "General Linear Cameras," In: Pajdla T., Matas J. (eds) Computer Vision—ECCV 2004. ECCV 2004. Lecture Notes in Computer Science, vol. 3022. Springer, Berlin, Heidelberg. https://doi.org/10.1007/978-3-540-24671-8_2.

Moeslund, T. B., & Granum, E. (2001), "A Survey of Computer Vision-Based Human Motion Capture," Elsevier, 81 (3), 231-268. doi: https://doi.org/10.1006/cviu.2000.0897.

\* cited by examiner

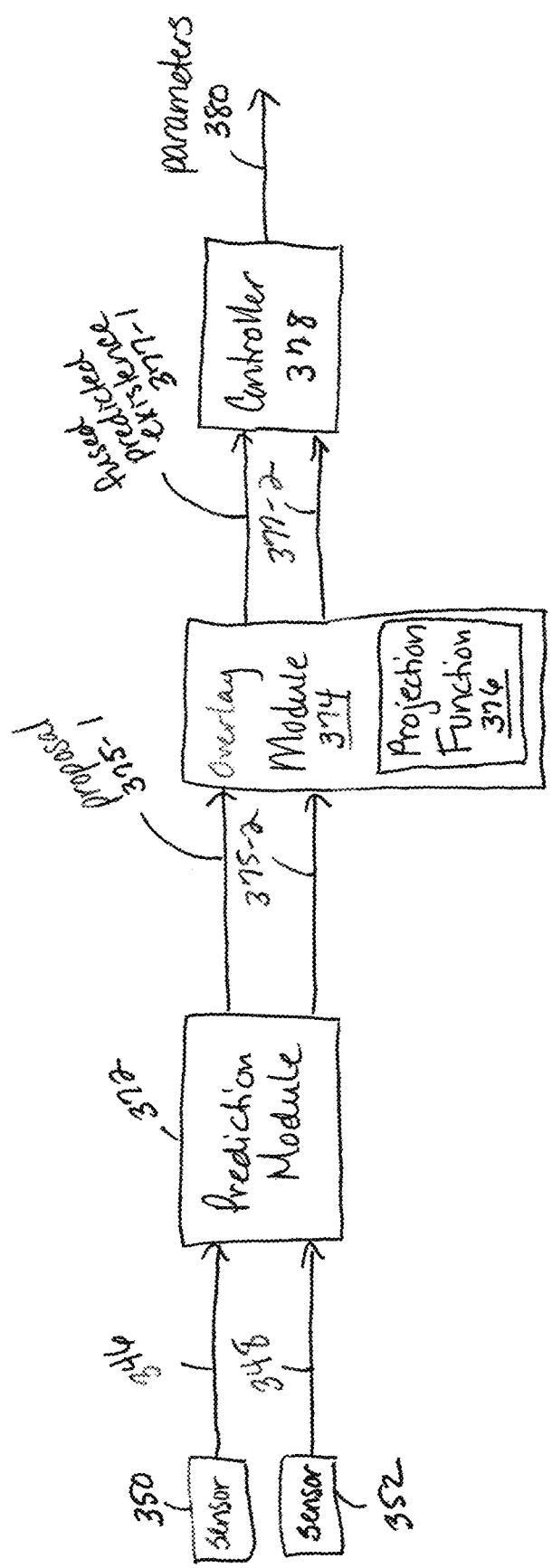

$$X_{Thermal} = \begin{bmatrix} 1 & x^1_{min} & y^1_{min} & x^1_{max} & y^1_{max} \\ 1 & x^2_{min} & y^2_{min} & x^2_{max} & y^2_{max} \\ & & \cdots & & \\ 1 & x^n_{min} & y^n_{min} & x^n_{max} & y^n_{max} \end{bmatrix}, Y_{Thermal} = \begin{bmatrix} x^1_{min} & y^1_{min} & x^1_{max} & y^1_{max} \\ x^2_{min} & y^2_{min} & x^2_{max} & y^2_{max} \\ & \cdots & & \\ x^n_{min} & y^n_{min} & x^n_{max} & y^n_{max} \end{bmatrix}$$

$$X_{VC} = \begin{bmatrix} 1 & x^1_{min} & y^1_{min} & x^1_{max} & y^1_{max} \\ 1 & x^2_{min} & y^2_{min} & x^2_{max} & y^2_{max} \\ & & \cdots & & \\ 1 & x^n_{min} & y^n_{min} & x^n_{max} & y^n_{max} \end{bmatrix}, Y_{VC} = \begin{bmatrix} x^1_{min} & y^1_{min} & x^1_{max} & y^1_{max} \\ x^2_{min} & y^2_{min} & x^2_{max} & y^2_{max} \\ & \cdots & & \\ x^n_{min} & y^n_{min} & x^n_{max} & y^n_{max} \end{bmatrix}$$

| Collect | Thermal_Non-null | Thermal_Total | VC_Non-null | VC_Total | MS_Non-null | MS_Total | All_Non-null | All_Total |
|---|---|---|---|---|---|---|---|---|
| 11-17 EXO | 6569 | 8373 | 3649 | 4071 | 1157 | 1738 | 11375 | 14182 |
| 11-17 DJI | 9483 | 10852 | 5252 | 5348 | 1958 | 2411 | 16693 | 18611 |
| 11-19 DJI | 8442 | 12594 | 4877 | 5916 | 1770 | 3230 | 15089 | 21740 |
| Total | 24494 | 31819 | 13778 | 15335 | 4885 | 7379 | 43157 | 54533 |

| Videocolor & Thermal | | | |
|---|---|---|---|
| | 11-17-20 DM | 11-17-20 EVO | 11-19-20 DM | Total |
| # Training Images | 2639 | 1836 | 2109 | 6584 |
| # Testing Images | 1131 | 788 | 904 | 2823 |

| Videocolor & Multispectral | | | |
|---|---|---|---|
| | 11-17-20 DM | 11-17-20 EVO | 11-19-20 DM | Total |
| # Training Images | 1038 | 623 | 1022 | 2683 |
| # Testing Images | 446 | 267 | 438 | 1151 |

| Thermal & Multispectral | | | |
|---|---|---|---|
| | 11-17-20 DM | 11-17-20 EVO | 11-19-20 DM | Total |
| # Training Images | 1354 | 802 | 1232 | 3388 |
| # Testing Images | 345 | 581 | 528 | 1454 |

| Videocolor & Thermal & Multispectral | | | |
|---|---|---|---|
| | 11-17-20 DM | 11-17-20 EVO | 11-19-20 DM | Total |
| # Training Images | 1026 | 617 | 1017 | 2660 |
| # Testing Images | 440 | 265 | 437 | 1142 |

FIG. 13D

| Videocolor | AP | AP50 | AP75 | AR | F1 |
|---|---|---|---|---|---|
| All | 0.694 | 0.780 | 0.650 | 0.752 | 0.722 |
| No Evo | 0.731 | 0.950 | 0.913 | 0.795 | 0.762 |

FIG. 15A

| Thermal | AP | AP50 | AP75 | AR | F1 |
|---|---|---|---|---|---|
| All | 0.604 | 0.715 | 0.781 | 0.710 | 0.653 |
| No Evo | 0.637 | 0.934 | 0.777 | 0.751 | 0.689 |

FIG. 15B

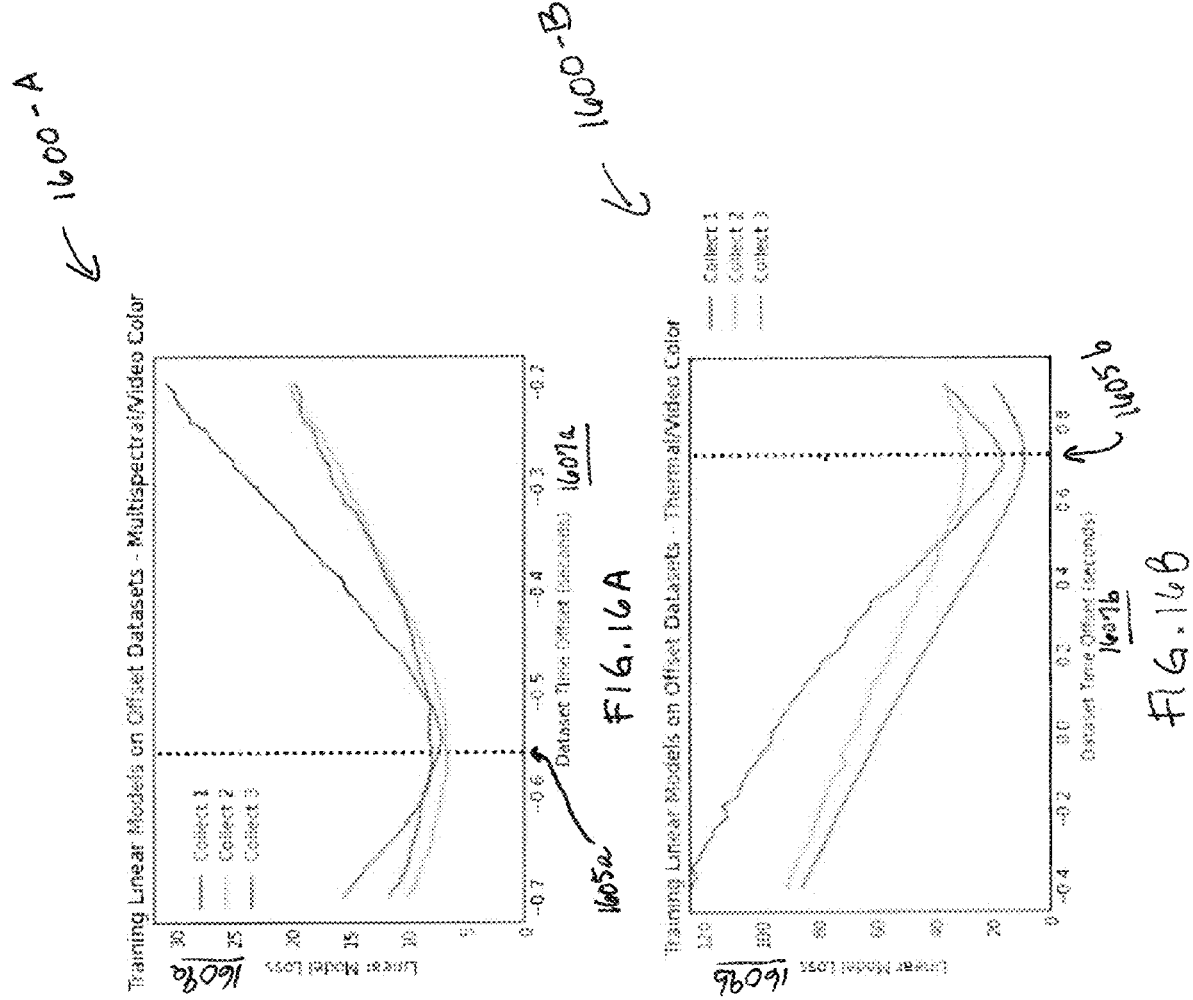

Individual Models

Videocolor

| Run Number | AP | AP50 | AP75 | AR | F1 | Loss |
|---|---|---|---|---|---|---|
| 1 | 0.542 | 0.831 | 0.628 | 0.591 | 0.565 | 0.089 |
| 2 | 0.539 | 0.810 | 0.628 | 0.591 | 0.564 | 0.098 |
| 3 | 0.531 | 0.820 | 0.602 | 0.582 | 0.556 | 0.068 |
| Average | 0.537 | 0.820 | 0.619 | 0.588 | 0.562 | 0.085 |

Thermal

| Run Number | AP | AP50 | AP75 | AR | F1 | Loss |
|---|---|---|---|---|---|---|
| 1 | 0.611 | 0.960 | 0.707 | 0.671 | 0.640 | 0.077 |
| 2 | 0.595 | 0.959 | 0.676 | 0.658 | 0.625 | 0.084 |
| 3 | 0.610 | 0.960 | 0.699 | 0.669 | 0.638 | 0.077 |
| Average | 0.606 | 0.959 | 0.694 | 0.666 | 0.634 | 0.079 |

Multispectral

| Run Number | AP | AP50 | AP75 | AR | F1 | Loss |
|---|---|---|---|---|---|---|
| 1 | 0.515 | 0.866 | 0.508 | 0.570 | 0.541 | 0.076 |
| 2 | 0.519 | 0.892 | 0.504 | 0.572 | 0.544 | 0.073 |
| 3 | 0.501 | 0.864 | 0.512 | 0.553 | 0.526 | 0.090 |
| Average | 0.512 | 0.874 | 0.508 | 0.565 | 0.537 | 0.079 |

FIG. 17

| VideoColor Model | Weights | AP | AP50 | AP75 | AR | F1 |
|---|---|---|---|---|---|---|
| VideoColor Individual | ImageNet | | | | | |
| VideoColor (with Thermal) | ImageNet | 64.1 | | 76.8 | 69.7 | 66.7 |
| VideoColor (with Multispectral) | ImageNet | 63.5 | 97.9 | 74.7 | 69.3 | 66.3 |
| VideoColor (with Thermal and Multispectral) | ImageNet | 64.8 | 97.8 | 77.6 | 70.4 | 67.5 |
| VideoColor (with Thermal) | Pretrained | | | | | |
| VideoColor (with Multispectral) | Pretrained | 65.1 | 98.0 | 77.6 | 70.0 | 67.5 |
| VideoColor (with Thermal and Multispectral) | Pretrained | | 98.2 | | | |

| Thermal Model | Weights | AP | AP50 | AP75 | AR | F1 |
|---|---|---|---|---|---|---|
| Thermal Individual | ImageNet | 60.6 | 95.9 | | | |
| Thermal (with VideoColor) | ImageNet | | | | | |
| Thermal (with Multispectral) | ImageNet | | | | 73.2 | |
| Thermal (with VideoColor and Multispectral) | ImageNet | 64.8 | 96.3 | 77.9 | 72.4 | 68.4 |
| Thermal (with VideoColor) | Pretrained | | | 69.7 | 71.1 | 64.7 |
| Thermal (with Multispectral) | Pretrained | | | | | |
| Thermal (with VideoColor and Multispectral) | Pretrained | 64.6 | 95.8 | 77.5 | 73.1 | 68.6 |

| Multispectral Model | Weights | AP | AP50 | AP75 | AR | F1 |
|---|---|---|---|---|---|---|
| Multispectral Individual | ImageNet | 51.2 | 87.4 | 50.8 | | |
| Multispectral (with VideoColor) | ImageNet | 49.2 | | 51.2 | 65.2 | 56.1 |
| Multispectral (with Thermal) | ImageNet | | | | 64.6 | |
| Multispectral (with VideoColor and Thermal) | ImageNet | 51.5 | 87.7 | 54.3 | | 58.0 |
| Multispectral (with VideoColor) | Pretrained | | 82.1 | 55.0 | 60.0 | |
| Multispectral (with Thermal) | Pretrained | | | 53.8 | | |
| Multispectral (with VideoColor and Thermal) | Pretrained | 51.0 | 86.0 | | | 57.7 |

| Video Color Space | Weights | AP | AP50 | AP75 | AR | F1 | Train Time (H:M:S) | Inference Time (s/img) |
|---|---|---|---|---|---|---|---|---|
| VideoColor Individual | ImageNet | 53.7 | 82.0 | 61.9 | 58.8 | 56.2 | 0:35:57 | 0.082613 |
| VideoColor (with Thermal) | ImageNet | 64.1 | 98.6 | 76.8 | 69.7 | 66.7 | 0:50:04 | 0.244497 |
| VideoColor (with Thermal) | Pretrained | 68.1 | 98.9 | 82.6 | 73.0 | 70.5 | 0:49:51 | 0.243338 |

1913-b

| Thermal Space | Weights | AP | AP50 | AP75 | AR | F1 | Train Time (H:M:S) | Inference Time (s/img) |
|---|---|---|---|---|---|---|---|---|
| Thermal Individual | ImageNet | 60.6 | 95.9 | 69.4 | 66.6 | 63.4 | 0:16:36 | 0.060305 |
| Thermal (with Multispectral) | ImageNet | 68.0 | 99.0 | 83.0 | 73.2 | 70.5 | 0:49:50 | 0.243140 |
| Thermal (with Multispectral) | Pretrained | 68.3 | 99.0 | 83.2 | 74.2 | 71.1 | 0:45:33 | 0.241549 |

1915-b

| Multispectral Space | Weights | AP | AP50 | AP75 | AR | F1 | Train Time (H:M:S) | Inference Time (s/img) |
|---|---|---|---|---|---|---|---|---|
| Multispectral Individual | ImageNet | 51.2 | 87.4 | 50.8 | 56.5 | 53.7 | 0:11:21 | 0.052712 |
| Multispectral (with Thermal) | ImageNet | 53.3 | 92.6 | 55.9 | 64.6 | 58.4 | 0:49:50 | 0.243140 |
| Multispectral (with Thermal) | Pretrained | 53.3 | 92.1 | 55.0 | 65.9 | 58.9 | 0:45:33 | 0.241549 |

METHOD AND APPARATUS FOR MULTI-MODAL FUSION OF SPATIAL-TEMPORAL DATA

RELATED APPLICATIONS

This application claims the benefit of U.S. Provisional Application No. 63/169,205, filed on Mar. 31, 2021 and U.S. Provisional Application No. 63/214,579, filed on Jun. 24, 2021. The entire teachings of the above applications are incorporated herein by reference.

GOVERNMENT SUPPORT

This invention was made with government support under AFRL FA8750-18-C-0041 from AFRL/IF Air Force Research Laboratory, Information Directorate. The government has certain rights in the invention.

BACKGROUND

Multi-modal fusion is the integration of multi-modal data, such as the integration of visual data and audio data for non-limiting example. Multi-modal fusion has gained the attention of researchers due to the benefit it provides for various multimedia analysis tasks that may involve processing multi-modal data in order to, for example, gain understanding about a situation or activity.

SUMMARY

According to an example embodiment, a computer-implemented method for operating a system observing a feature in a scene comprises predicting existence of the feature in the scene for each of at least two modes of observation of the scene. The predicting is performed by calculating a proposal of the existence of the feature within a respective bounded region of a representation of the scene for each of the at least two modes of each observation of a sequence of observations. The computer-implemented method further comprises overlaying the proposal of the existence of the feature within the respective bounded region for each of the at least two modes by using a projection function that shares information between or among modes to generate a corresponding fused predicted existence of the feature for each of the at least two modes of each observation. The computer-implemented method further comprises updating parameters used for operating the system. The parameters are updated based on each observation of the sequence of observations as a function of: (i) the predicted existence of the feature for at least one mode of the at least two modes, (ii) the corresponding fused predicted existence of the feature for the at least two modes, or (iii) a combination of (i) and (ii).

Using the projection function may include spatially aligning corresponding proposals for the existence of the feature in the at least two modes to convert coordinates from one mode to another mode, thereby aligning the respective bounded region of each of the at least two modes.

Calculating the proposal of the feature may include, for each of the at least two modes, using a region proposal network (RPN) to generate proposals and then learning a corresponding probability of the feature within the respective bounded regions.

The computer-implemented method may further comprise placing predetermined control points at pixel positions within the respective bounded region of each of the at least two modes and generating deltas between corresponding control points of the respective bounded regions. The overlaying may be performed as a function of the deltas generated to align the proposals. The overlaying may include fusing the aligned proposals to enable information sharing, via the projection function, between or among the at least two modes.

Predicting the existence of the feature in the representation of the scene may include using a faster region-based convolutional neural network including a feature pyramid network (FPN), RPN, and final prediction network. The computer-implemented method may further comprise extracting features in the scene by applying the FPN to the sequence of observations, identifying potential regions of interest by applying the RPN to the features extracted, generating the respective bounded region for the potential regions identified, and fusing outputs for a given mode of the at least two modes. The fusing may include using a projection function that guides fusion of bounded regions of the other of the at least two modes onto the bounded region of the given mode.

The computer-implemented method may further comprise implementing the at least two modes of observation by acquiring data continuously from at least two sensors.

The at least two sensors may be from a group of sensors including: a multi-spectral sensor, video sensor, thermal sensor, or other modality-specific sensor.

Each observation may be a respective frame of data from the data acquired. The computer-implemented method may further comprise generating the sequence of observations from a plurality of consecutive, continuously collected frames of the data acquired.

The computer-implemented method may further comprise performing temporal matching of the data acquired from the at least two sensors.

The feature may be an object and the operating may include notifying another system of fusion performance associated with a given mode of the at least two modes. The fusion performance may represent utility of the given mode for observing the feature in the scene. The operating may further include notifying another system of the existence of the object via a wired or wireless communications path, or a combination thereof.

The computer-implemented method may further comprise changing a total number of the at least two modes, the total number changed based on fusion performance of a given mode of the at least two modes.

According to another example embodiment, a system comprises a prediction module configured to predict existence of a feature in a scene, for each of at least two modes of observation of the scene, by calculating a proposal of the existence of the feature within a respective bounded region of a representation of the scene for each of the at least two modes of each observation of a sequence of observations. The system further comprises an overlay module configured to overlay the proposal of the existence of the feature within the respective bounded region for each of the at least two modes by using a projection function that shares information between or among modes to generate a corresponding fused predicted existence of the feature for each of the at least two modes of each observation. The system further comprises a controller configured to operate the system based on parameters. The controller is further configured to update the parameters based on each observation of the sequence of observations as a function of: (i) the predicted existence of the feature for at least one mode of the at least two modes, (ii) the corresponding fused predicted existence of the feature for the at least two modes, or (iii) a combination of (i) and (ii).

Alternative system embodiments parallel those disclosed above in connection with the example computer-implemented method embodiment.

It should be understood that example embodiments disclosed herein can be implemented in the form of a method, apparatus, system, or non-transitory computer readable medium with program codes embodied thereon.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3 is a block diagram of an example embodiment of a system for observing a feature in a scene.

FIGS. 7A-1 through 7A-8 and FIGS. 7B-1 through 7B-8 are images demonstrating and example embodiment of temporal matching.

FIG. 8 is a representation of an example embodiment of matrices for a projection function.

FIG. 11 is table with example embodiments of raw data used in machine learning/artificial intelligence (ML/AI).

FIGS. 13A-D are tables with example embodiments of numbers of training images and testing images for each sensor modality and combination of modalities.

FIGS. 15A-B are tables with example embodiments of test results.

FIGS. 16A-B are graphs of example embodiments of timestamp shift versus projection network loss.

FIG. 17 is a table with example embodiments of results of pretrained trials.

FIG. 18A is a table with example embodiments of evaluation results within output modality spaces.

FIG. 18B is a table with example embodiments of fusion model results.

FIGS. 20A-1-1 through 20A-1-3 are images of example embodiments of drone prediction in all modalities from cumulative information sharing.

FIGS. 20A-2-1 through 20A-2-3 are images of example embodiments of drone prediction from each modality's individual modality model.

FIGS. 20B-1-1 through 20B-1-3 are additional images of example embodiments of drone prediction in all modalities from cumulative information sharing.

FIGS. 20B-2-1 through 20B-2-3 are additional images of example embodiments of drone prediction from each modality's individual modality model.

FIGS. 20C-1-1 through 20C-1-3 are additional images of example embodiments of drone prediction in all modalities from cumulative information sharing.

FIGS. 20C-2-1 through 20C-2-3 are additional images of example embodiments of drone prediction from each modality's individual modality model.

DETAILED DESCRIPTION

Figure 1:
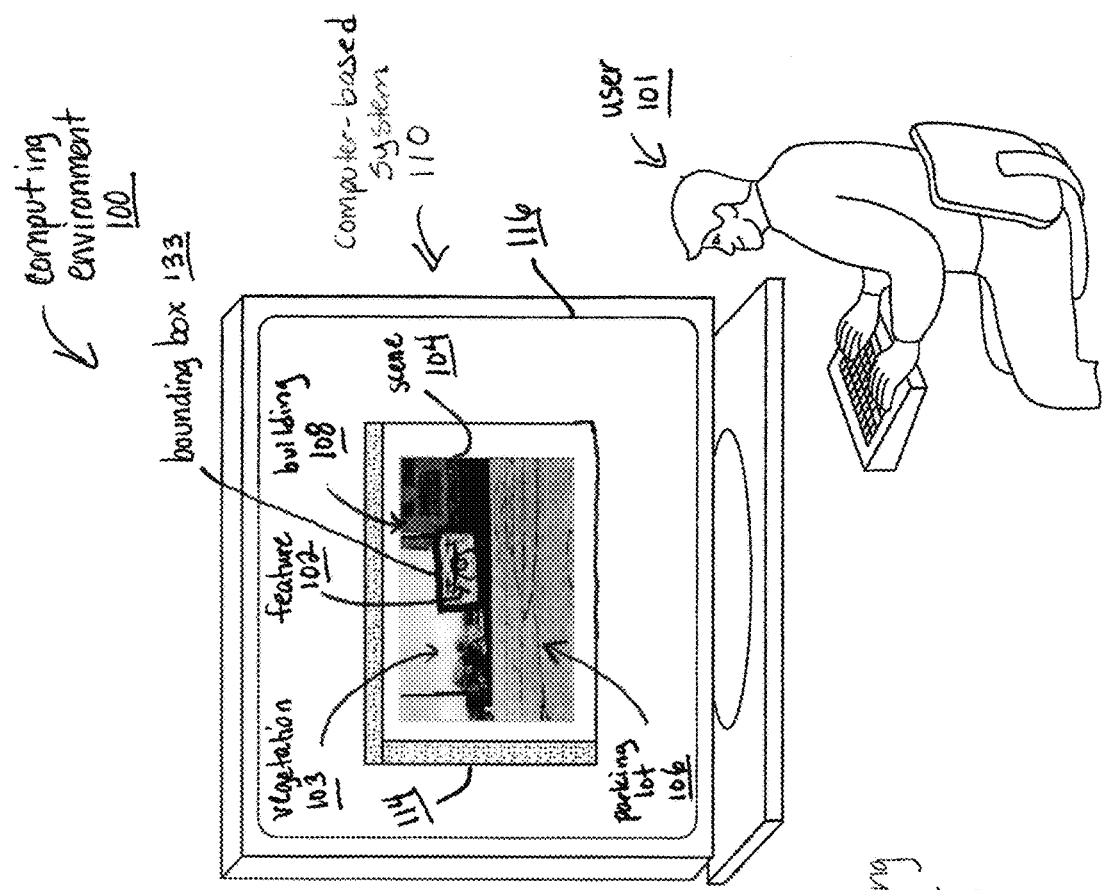
FIG. 1 is a block diagram of an example embodiment of computing environment in which various embodiments of the present disclosure may be implemented.

A description of example embodiments follows.

A mode may be referred to interchangeably herein as a modality. While an example embodiment disclosed herein may employ a modality, such as a video color (VC), thermal, or multispectral (e.g., 450 nm, 550 nm, 650 nm, 750 nm, 850 nm, and 950 nm) modality, it should be understood that such an example embodiment is not limited to the number of modalities or the types of modalities employed. For non-limiting example, a depth, laser identification detection and ranging (LiDAR), radio detection and ranging (RADAR), or another modality may be employed. Further, while an example embodiment disclosed herein may detect, identify, and track a small object of interest, such as a drone, it should be understood that the small object of interest is not limited to a drone. Further, while an example embodiment of a multi-modal system disclosed herein may be described as a multi-modal, data-driven defeat small Unmanned Aerial System (SUAS) or counter drone, it should be understood that the example embodiment is not limited to same.

One of the biggest problems with multi-modality is spatial asynchrony within data sources. Neural network (NN) fusion can help with this by using temporally aligned (synchronously collected) data sharing a common field of view (FOV). Typical multimodal fusion approaches that are described in the literature include early fusion and late fusion (fusion at the decision level), or a combination of the two (Feng, D., et al., (2020). "Deep Multi-modal Object Detection and Semantic Segmentation for Autonomous Driving: Datasets, Methods, and Challenges," Retrieved from https://arxiv.org/abs/1902.07830).

Early fusion involves fusing raw data before it is input into a model and allows a model to have all information when making decisions at each step. It works best when data are spatially aligned at the onset to enable image stacking, otherwise early fusion is sensitive to data misalignment (Wagner, J., et al., (2016). "Multispectral Pedestrian Detection using Deep Fusion Convolutional Neural Networks," Retrieved from http://ais.uni-bonn.de/papers/ESANN_2016_Wagner.pdf; Wu, Z., et al., (2006). "Multi-level fusion of audio and visual features for speaker identification," In: International Conference on Advances in Biometrics, pp. 493-499.).

Late fusion (decision-level) fuses information at decision time (or close to decision time). Late fusion includes outputs that use the entire model, which can increase storage space and computational power. Typically, this happens through either voting methods (Morvant, E. et al (2014). "Majority vote of diverse classifiers for late fusion," in Lecture Notes in Computer Science Description. Berlin, Germany: Springer) or decision averaging (Shutova, E., et al., (2016). "Black holes and white rabbits: Metaphor identification with visual features," in Proc. Conf. North Amer. Chapter Assoc. Comput. Linguistics: Human Language Technol., 2016, pp. 160-170). Late fusion is generally found to be a better predictor than early fusion, however, it lacks sharing of information during model deployment and the associated beneficial learning that this may bring.

Middle (hybrid) fusion enables information sharing between modalities during runtime, maximizing the benefits of multi-modality through synergistic learning. Hybrid fusion methods utilize both early and late fusion approaches in a single unified framework and combine outputs from early fusion with individual modality predictors (Lan et al., (2014). "Multimedia classification and event detection using double fusion," Multimedia Tools Appl., vol. 71, pp. 333-347). Hybrid neural network fusion methods may be a common approach for multimodal fusion; however, such methods produce limited interpretability (Baltrusaitis et al., (2019)," Multimodal Machine Learning: A Survey and Taxonomy," IEEE Transactions on Pattern Analysis and Machine Intelligence, vol. 41, no. 2, pp. 423-443., doi: 10.1109/tpami.2018.2798607).

An example embodiment for middle fusion disclosed herein employs a novel auxiliary module, referred to herein as a Multi-Modal Region Proposal Network (MMRPN). with a novel projection function to improve interpretability. The projection function acts as an "explicit" fusion function, which guides the fusion of latent representations of corresponding components (called proposals) across individual modalities, as opposed to combining entire scenes captured via such modalities. A non-limiting example embodiment of a system that may employ the novel MMRPN with the projection function is a multi-modal, data-driven defeat SUAS, referred to herein as DS2, that may be used for force protection.

The term sUAS generally refers to small Unmanned Aircraft System, a form of unmanned aerial vehicles, often described as hobbyist drones. Off-the-shelf drones are small, and easy to confuse/obscure. Off-the-shelf drones are readily available, making it easy for adversaries to weaponize them; use them for unauthorized reconnaissance and surveillance of targets and individuals; or for smuggling illicit materials. Such scenarios increase risk to sensitive buildings, facilities, and personnel. As a countermeasure, an example embodiment of a multi-modal, data-driven defeat sUAS (DS2) may be used to detect and track a drone and/or drone swarms flying over critical areas for non-limiting example.

The speed and varying shapes of such drones makes discovery of a sUAS a complex and difficult goal. While uniform in structure, drones are of diverse design and configurations and include, for non-limiting example, nano, mini, camera, and racing drones, as well as other variations. Drones may be flown as fixed wing, rotor craft, power lift, with varying styles of engines from piston propeller to rotors, jets and electric. Typical examples weigh less than 55 pounds and more than 0.55 pounds on takeoff. Flight rules necessitate they fly at less than 100 mph—usually between 25 to 75 mph—with cruise altitudes under 400 feet above ground level (~350 feet). Anything out of range is anomalous and, thus, useful to detect.

An example embodiment disclosed herein combines data from multimodal sensors via artificial intelligence (AI), and enables accuracy of a system (DS2) for detecting and tracking SUAS, appraised using evaluation metrics disclosed further below. Fundamental to development of an example embodiment of such a system is adequate, clean input training data that captures an assortment of SUAS options, either individually, or in groups, to feed an example embodiment of a deep learning model.

According to an example embodiment, 80-90% of disruptive ML/AI training data for a system, such as DS2, may be derived from customized data development, data cleaning, and data integration as disclosed further below. New data collection may be done through an established drone cage testing facility, as disclosed further below. Output datasets can also be tested for DS2 development using the same environment. Cyclical gathering of training, validation then testing, and development data is the mechanism by which ML/AI accuracies are appraised and improved, and such a cyclic process was employed in the development of an example embodiment of a multi-modal system disclosed herein, such as the multi-modal system 112 of FIG. 1, disclosed below.

FIG. 1 is a block diagram of an example embodiment of computing environment 100 for collecting a portion of training data for training a system, such as a multi-modal, data-driven defeat SUAS, that is, the multi-model system 112. In the computing environment 100, the multi-model system 112 is shown as being used to collect multi-model data used for generating a portion of training data 124. Such multi-model data, namely, the thermal data 154-1, video color data 154-2, and multispectral data 154-3 is acquired via a thermal sensor 118, video color sensor 120, and multispectral sensor 122, respectively, in the example embodiment.

The training data 124 is acquired in multimodality, in a way that captures different SUAS models (not shown) under different conditions (dark/light, seasonal, weather, different environments, etc.) and in different numbers (e.g., independently, or flown in groups). While a brief overview of training data used for training a multi-modal system is described with regard to FIG. 1, detail regarding acquisition of training data, labeling of training data, etc. is disclosed further below.

Continuing with reference to FIG. 1, the training data 124 may be used to train the multi-model system 112 or another multi-modal system (not shown). That is, the multi-modal system used to collect the multi-modal data need not be the same multi-modal system that is trained based on the training data 124. In the example embodiment of FIG. 1, the computing environment 100 includes a computer-based system 110 coupled to a knowledge database 126 via a wired or wireless connection 128. The knowledge database 126 may be used to store the training data 124 that may be created (generated) based on the multi-modal data acquired, and the training data may be updated by the computer-based system 110, which may be a semi-automatic training system. The training data 124 may be used for training the multi-modal system 112 or another multi-modal system to detect and track features in scenes, such as the feature 102 in the scene 104 that may be included in the training data 124.

In the example embodiment of FIG. 1, a user 101 is using the computer-based system 110 to update the training data 104 by annotating the scene 104 via a web interface 114 of an annotation tool, such as Scalabel for non-limiting example. The web interface 114 may be implemented as a so-called window, tab, screen view, or the like, and is presented on a display screen 116 of the system 110 for user interaction.

The user 101 is annotating the scene 104 which includes the feature 102, as well as vegetation 103, a building 108, and a parking lot 106 which can make detection of the feature 102 difficult. The user 101 is annotating the scene 104 to add a bounding box 133 around the feature 102, which is a drone in the example embodiment. The user 101 is annotating the scene 104 to include the bounding box 133 to correct the training data 124 that did not detect the feature 102 in the scene 104. Such an annotation, that is, the bounding box 133, is provided toward educating (training) a multi-modal system, such as the multi-modal system 112, to extract relevant information from data, such as the feature 102. The multi-modal system 112 may use a projection function that shares information between or among modes (modalities) to observe such a feature. The projection function may be implemented as part of a projection network, disclosed below with regard to FIG. 2A.

Figure 2A:
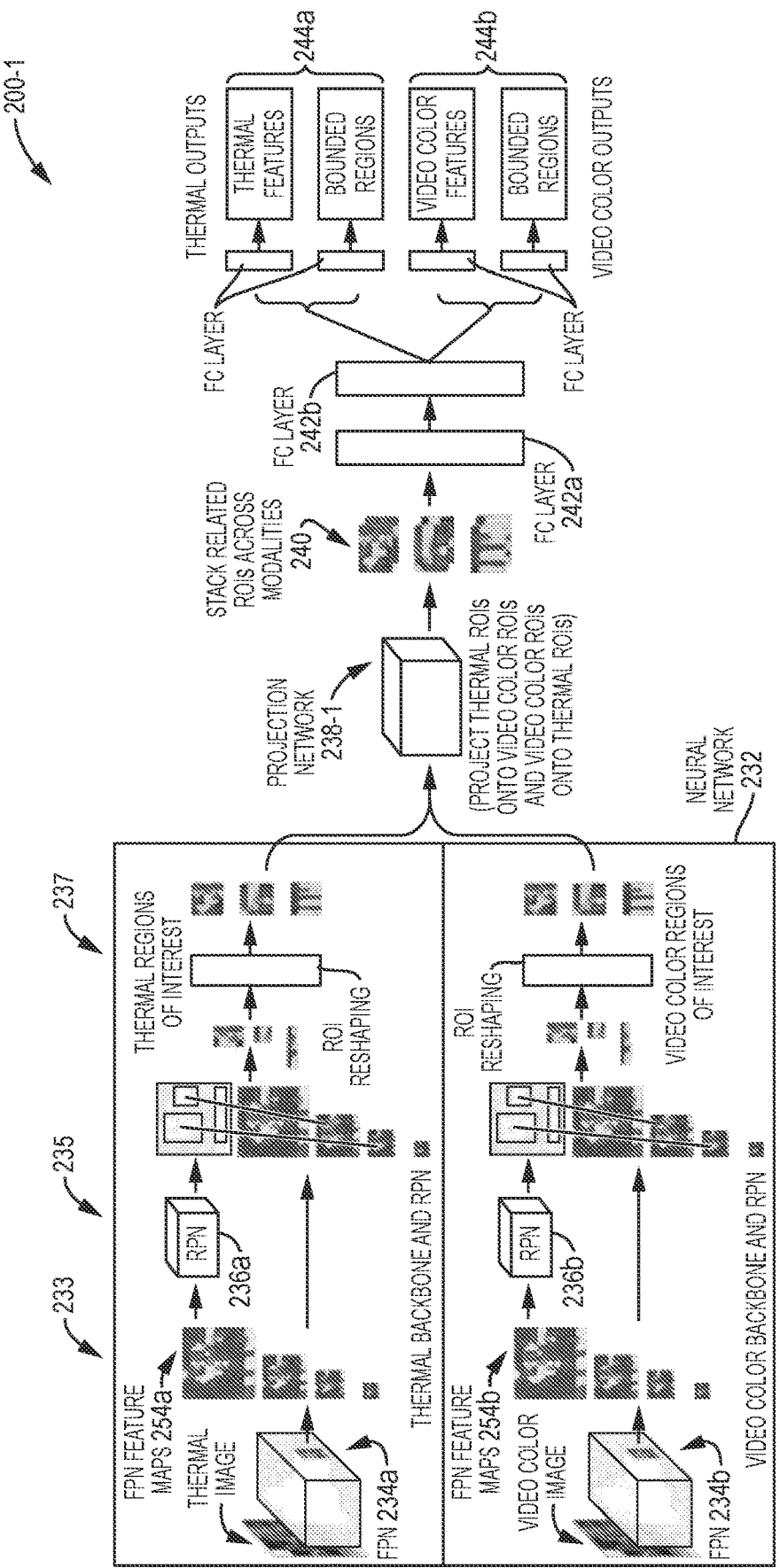
FIG. 2A is a schematic diagram of an example embodiment of a multi-modal fusion model architecture

FIG. 2A is a schematic diagram of an example embodiment of a multi-modal fusion model architecture 200-1. As disclosed above, one of the biggest problems with multi-modality is spatial asynchrony within data sources. This is where neural network (NN) fusion can be helpful. Such NN fusion may be based on adapting and modifying open-source AI methods using the Faster RCNN with Feature Pyramid Network (FPN) network model architecture (Wu et al., 2019, Detectron2 (Version 0.2.1) [Computer software]. Github/detectron2). In the architecture 200-1, a NN 232 is constructed with three major detection components: the feature extraction FPN component 233, the Region Proposal Network (RPN) and the Regions-of-Interest (ROI) head 237 that is used to make the final decision. The three-stage detection is favored over a one or two-stage detector, e.g., YOLO (Redmon, et al., (2016). "You Only Look Once: Unified, Real-Time Object Detection," Retrieved from https://arxiv.org/abs/1506.02640), where the location of each cell is fixed.

A main intuition that guides the novel, middle fusion approach of FIG. 2A is that rather than analyzing all proposals across all modalities simultaneously, or individually, the model produced based on the architecture 200-1 only needs to analyze corresponding proposals across the modalities; that is, in some embodiments, the model only considers the information provided by the other modalities regarding the same object. The use of Region Proposal Networks RPNs (RPNs) not only improves model performance by optimizing the way information is shared to make a final classification, it also optimizes runtimes since only the RPNs (236a, 236b) need to be aligned in the network.

As such, the architecture 200-2 includes feature pyramid networks (FPNs), where each FPN (234a, 234b) extracts features using one modality (thermal, video) and each FPN (234a, 234b) provides feature maps (254a, 254b) to a respective RPN (236a, 236b). The novel Multi-Modal RPN architecture 200-1 uses a novel projection network 238 that aligns multi-modal feature maps to generate the new proposals 240.

According to an example embodiment, a projection function learned by the projection network 238 converts coordinates from one modality to coordinates of the corresponding location in another modality. Owing to different camera image qualities, and FOVs, images from separate modalities are not in the same pixel locations. Without the projection network 238 to link modalities, meaningful fusion is unachievable. The projection network 238, therefore, is an important component for the proposed multi-modal fusion architecture 200-1. Since projection between two images should be linear (field of lens optics), an example embodiment corrects for temporal misalignment using, for non-limiting example, a pair of matching video and thermal images, identifying the closest timestamps, then shifting the timestamps of the video images, such as disclosed further below. Applying a universal correction enables corrected fusion of thermal and video.

The architecture 200-1 further includes final fully connected (FC) classification layers (242a, 242b) that split the new proposals 240 and produce modality specific proposals, that is, the thermal outputs 244a and video color outputs 244b. It should be understood that such thermal and video color modalities are for non-limiting example. An output of an example embodiment of the projection network 238 is disclosed below with regard to FIG. 2B.

Figure 2B:
FIG. 2B is a photograph illustrating an output of an example embodiment of a final projection network.

FIG. 2B is a photograph illustrating an output of an example embodiment of a final projection network which utilizes temporal adjustments and is capable of successfully learning a projection function, as disclosed further below. The output includes a feature 202 that is a drone for non-limiting example. The projection network that produces such an output may be integrated into a multi-modal fusion architecture of a model disclosed herein, which is useful for the model to begin multi-modal predictions of the existence of the feature 202. An example embodiment of such a multi-modal fusion model architecture is disclosed above with regard to FIG. 2B and below with regard to FIG. 2C.

Figure 2C:
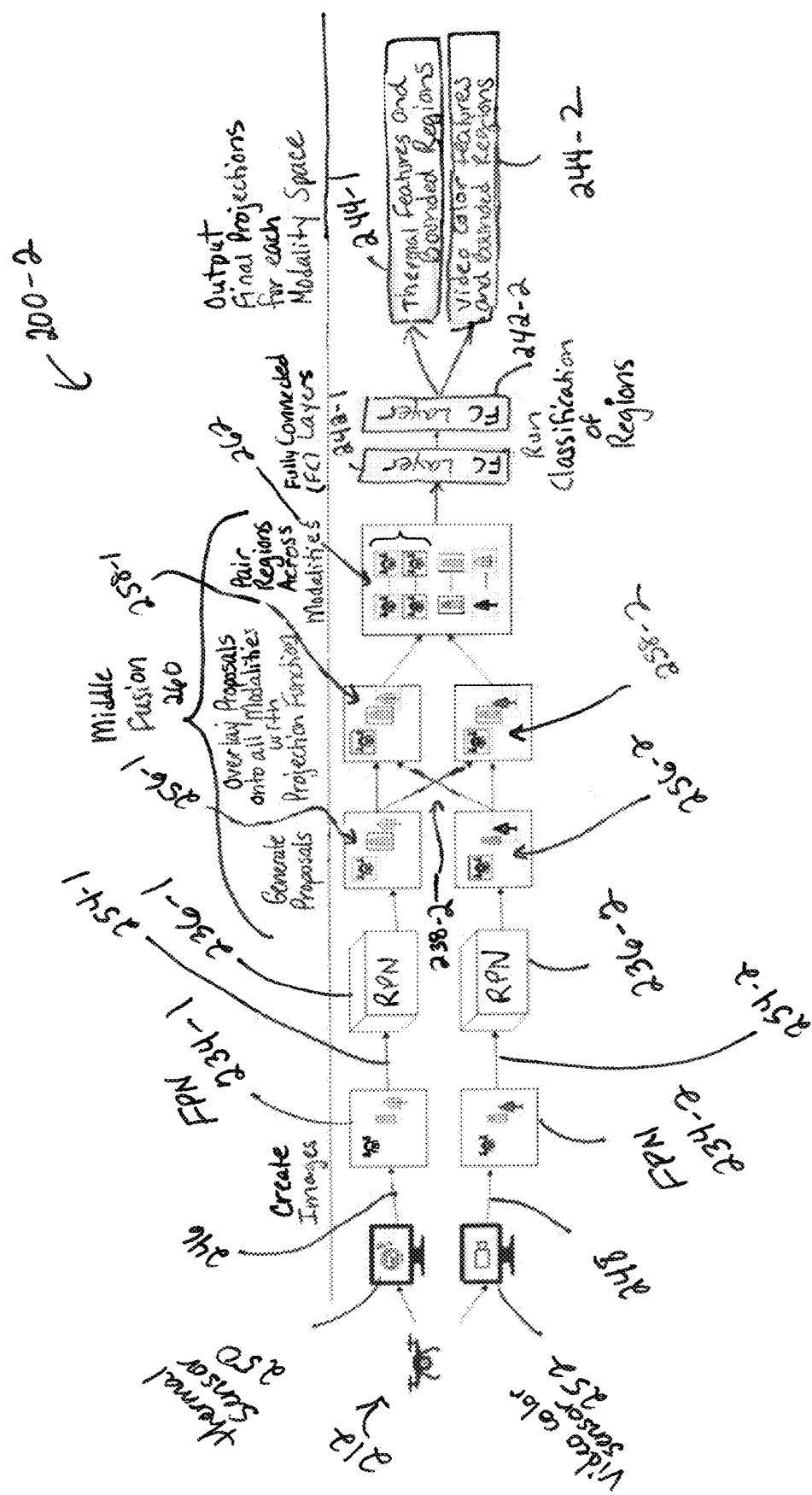
FIG. 2C is a schematic diagram of another example embodiment of a multi-modal fusion model architecture that may be used to perform methods disclosed herein.

FIG. 2C is a schematic diagram of another example embodiment of a multi-modal fusion model architecture 200-2 that may be implemented by a system and used to perform methods disclosed herein. In the architecture 200-2, the lower neural net's feature pyramid networks (FPNs), namely the FPN 234-1 and FPN 234-2, each extract features from one modality. For example, the FPN 234-1 extracts features from thermal data 246, collected via a thermal sensor 250 of a multi-modal system 212, while the FPN 234-2 extracts features from video color data 246, collected via a video color sensor 252 of the multi-modal system 212.

Each FPN (234-1, 234-2) passes respective feature maps (254-1, 254-2) to a respective RPN (236-1, 236-2). The RPNs identify respective potential regions of interest (256-1, 256-2) (proposals) within the respective feature map (254-1, 254-2) received. A new projection function 238-2 for projection projects such modality specific proposals into other modality spaces to create a proposal set for each modality (258-1, 258-2). Each proposal set is a collection of "m" proposals, where "m" is the number of modalities, namely two (thermal and video color) in the non-limiting example of FIG. 2C.

Such modalities incorporate some overlapping field of view. Spatial misalignment is expected and corrected through the projection function 238-2. The task of data alignment is the process of establishing the relationship between spatially or temporally corresponding sub-components of various modalities (Baltrusaitis, et al. (2019). "Multimodal Machine Learning: A Survey and Taxonomy." IEEE Transactions on Pattern Analysis and Machine Intelligence, vol. 41, no. 2, pp. 423-443). This task stems from inherent discrepancies between various modalities, such as aligning audio and visual data for speech recognition (Potamianos, G., et al., (2003). "Recent advances in the automatic recognition of audio-visual speech," Proc. IEEE, vol. 91, no. 9, pp. 1306-1326) or aligning medical images for aided diagnosis (James, et al., (2014). "Medical image fusion: A survey of the state of the art," Inform. Fusion, vol. 19, pp. 4-19). Image alignment specifically deals with the resolution of spatial inconsistencies between multimodal images resulting from varying specifications or intrinsic camera parameters (Jiang, Y., et al. (2017). "Multimodal Image Alignment via Linear Mapping between Feature Modalities," Journal of Healthcare Engineering, vol. 2017, pp. 1-6). Generally, image alignment models can be characterized as either patch-based models, which maximize similarity scores between corresponding patches, or feature-based methods. The latter maps critical points/features across modalities (Shen, et al., (2014). "Multi-modal and multispectral registration for natural images," in European Conference on Computer Vision, pp. 309-324, Springer).

One standard approach in image alignment is the utilization of attention models. These are typically deep neural networks that can be trained to focus computation on corresponding sub-components across modalities (Bahdanau, et al., (2014) "Neural machine translation by jointly learning to align and translate," in Proc. Int. Conf. Learn. Representations). Another common approach is the creation of synthesis and analysis dictionaries (lower dimensional representations utilizing expert picked features) and developing a projection dictionary to link the two dictionaries (Hu, et al., "Nonlinear Dictionary Learning with Application to Image Classification," Pattern Recognition, vol. 75, 2018, pp. 282-291). In some cases, this projection dictionary can be a linear mapping (Jiang, Y., et al. (2017) "Multimodal Image Alignment via Linear Mapping between Feature Modalities," Journal of Healthcare Engineering, vol. 2017, pp. 1-6).

Alignment, which is achieved through an example embodiment of projection mapping disclosed herein, may be considered a proposal region or feature-based image alignment method. An example embodiment may aim to learn the projection between two (or more) modalities of four key features, in this case, the points defining a feature bounding box (region), differing from the current literature due to the simplicity of the bounding box parametrization which allows alignment to avoid learning synthesis or analysis dictionaries.

Continuing with reference to FIG. 2C, the middle fusion section 260 may be referred to as a Multi-Modal RPN (MMRPN) and aligns the corresponding proposals by pairing 262 regions across the modalities. The architecture 200-2 further includes a fully connected (FC) network including FC layers (242-1, 242-2) for synthesizing the predictions, that is, a thermal output 244-1 with thermal features and corresponding bounded regions, as well as a video color output 244-2, with video color features and corresponding bounded regions.

Using middle fusion 260, only corresponding RPNs (236-1, 236-2) across the modalities are simultaneously analyzed. An example embodiment of a method based on the architecture 200-1, thus, optimizes the amount of relevant information shared during fusion to make final determinations, in contrast to total information sharing employed by other methods. Model performance may be appraised using mean average precision (mAP), recall, loss and F1 metrics, as well as inference gifs for visual evaluation as disclosed further below. According to an example embodiment, a system may be based on an example embodiment of an architecture that employs such middle fusion 260, such as the system 312 disclosed below with regard to FIG. 3.

Figures 1, 3, 20A:
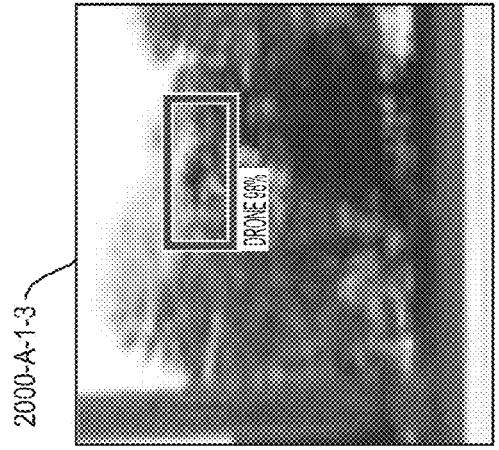

FIG. 3 is a block diagram of an example embodiment of a system 312 for observing a feature in a scene. The system 312 may be referred to as a multi-modal system and may be a multi-modal, data-driven defeat sUAS for non-limiting example. The system 312 comprises a prediction module 372 that is configured to predict existence of a feature (not shown) in a scene (not shown), for each of at least two modes (modalities) of observation of the scene. Such prediction is performed by calculating a proposal (375-1, 375-2) of the existence of the feature within a respective bounded region of a representation of the scene for each of the at least two modes of each observation of a sequence (not shown) of observations. The system 312 further comprises an overlay module 374 that is configured to overlay the proposal (375-1, 375-2) of the existence of the feature within the respective bounded region for each of the at least two modes by using a projection function 376. The projection function 376 shares information between or among modes to generate a corresponding fused predicted existence (377-1, 377-2) of the feature for each of the at least two modes of each observation. The system 312 further comprises a controller 378 configured to operate the system 312 based on parameters 380. The controller is further configured to update the parameters 380 based on each observation of the sequence of observations as a function of: (i) the predicted existence (e.g., 375-1, 375-2) of the feature for at least one mode of the at least two modes, (ii) the corresponding fused predicted existence (377-1, 377-2) of the feature for the at least two modes, or (iii) a combination of (i) and (ii).

The prediction module 372 may be further configured to acquire data (346, 348) continuously from at least two sensors (350, 352) thereby implementing the at least two modes (modalities) of observation. The at least two sensors (350, 352) may be from a group of sensors including: a multi-spectral sensor, video sensor, thermal sensor, or other modality-specific sensor. Each observation may be a respective frame of data from the data (346, 348) acquired. The prediction module 372 may be further configured to generate the sequence of observations from a plurality of consecutive, continuously collected frames of the data (346, 348) acquired. The predication module 372 may be further configured to perform temporal matching of the data (346, 348) acquired from the at least two sensors (350, 352). Such temporal matching is disclosed further below with regard to FIGS. 7A-1 through 7A-8 and FIGS. 7B-1 through 7B-8.

Using the projection function 376 may include spatially aligning corresponding proposals (375-1, 375-2) for the existence of the feature in the at least two modes to convert coordinates from one mode to another mode, thereby aligning the respective bounded region of each of the at least two modes.

To calculate the proposal (375-1, 375-2) of the feature, the prediction module 372 may be further configured, for each of the at least two modes, to use a region proposal network (RPN) to generate proposals and then learn a corresponding probability of the feature within the respective bounded regions.

The overlay module 374 may be further configured to place predetermined control points at pixel positions within the respective bounded region of each of the at least two modes, to generate deltas between corresponding control points of the respective bounded regions, and to overlay the proposal (375-1, 375-2) of the existence as a function of the deltas generated to align the proposals and fuse the aligned proposals to enable information sharing, via the projection function 376, between or among the at least two modes.

The prediction module 372 may be further configured to predict the existence of the feature in the representation of the scene using a faster region-based convolutional neural network including a feature pyramid network (FPN), RPN, and final prediction network. The predication module 372 may be further configured to extract features in the scene by applying the FPN to the sequence of observations, identify potential regions of interest by applying the RPN to the features extracted, generate the respective bounded region for the potential regions identified, and fuse outputs for a given mode of the at least two modes using the projection function 338 to guide fusion of bounded regions of the other of the at least two modes onto the bounded region of the given mode, such as shown in the middle fusion sections (260, 660, 2160) of FIGS. 2C, 6, and 21, respectively.

Continuing with reference to FIG. 3, the feature may be an object, such as a drone for non-limiting example, and the controller 378 may be further configured to notify, via a wired or wireless communications path, another system (not shown) of: fusion performance associated with a given mode of the at least two modes, the existence of the object, or a combination thereof. The fusion performance may represent utility of the given mode for observing the feature in the scene.

The controller 378 may be further configured to change a total number of the at least two modes. The total number may be changed based on fusion performance of a given mode of the at least two modes.

The prediction module 372, overlay module 374, and controller 378 may be trained based on a training dataset, disclosed in detail further below. The training dataset may include training data acquired from the at least two sensors (350, 352), such as the training data 124 of FIG. 1, disclosed above, and in detail further below. The training data may include the feature in a plurality of scenes. The plurality of scenes may be associated with a plurality of different environments and different conditions, as disclosed above and below. Example embodiments of ML/AI methods that may be performed by the system 312 and example embodiments of training data for training the system 312 are disclosed below.

Methods: Overview of ML/AI Methods for Data Acquisition and Processing Training Data The key to machine learning and AI success is clean, sanitized training data that appropriately educates a computer-implemented method to extract relevant information from massive input data. Getting enough high-quality training data to create a purpose-built platform is the most challenging part of building an AI-based prototype. For the DS2 prototype, the ability to collect custom data using a specialized drone facility is of distinct advantage here.

Machine learning (ML) algorithms (i.e., computer-implemented methods) that are used to learn behavior by analyzing the training data supplied. According to an example embodiment, training data are acquired in multimodality and, in a way that captures different models of SUAS's, under different conditions (dark/light, seasonal, weather), in different numbers (independently, or flown in groups).

Training data may be first acquired with sensors looking up to a target producing cleaner signals with significantly less clutter than if looking down. Thus, high-quality data, labeled by humans, infuse human intelligence into the machine learning process, and the DS2 prototype. Such choice of features for constructing an accurate identification system to reflect multiple contexts, without overfitting, is a notable issue in training data collection. Features are recommended to be efficient, robust and physically interpretable so as to obtain a machine processable data representation containing the key properties of the target. Discrimination from similar objects (e.g. birds, "small birds', 'big birds', balloons etc.) is facilitated with data from known models, such as available via ImageNet, and computer-implemented methods can be further developed to discern different types of motion.

ML/AI Methods

A variety of machine learning and computer vision methods may be tested in the earlier technical stages of development and implementation, with a focus on those documented to provide robust performances for outdoor scenarios.

Processing Pipeline

According to an example embodiment, a processing pipeline may include:

1) Data transformation of training data to data formats the machine learning expects, separating data into training, validation and test data sets;
2) Classification model training, e.g., using modified version of Detectron2 code.
3) Prediction to apply trained model weights on test images and ensure algorithms (i.e., computer-implemented methods) solve to extract SUAS as required and iterating 2 and 3 to strengthen connections.
4) With successful feature extraction methods established, data fusion can be considered. This requires innovative strategies that depend on projection and temporal registration disclosed herein.

Accuracy of the DS2 can be determined and predictive power of many layer neural nets established via comprehensive experiments using the drone cage. Using different scenarios, DS2 performance and efficacy can be evaluated. With basic design established, DS2 is prepared to incorporate multimodal fusion via more complex deep-learning strategies such that the strengths of each modality are capitalized upon and weaknesses overcome.

Object detection and classification is a complex task affected by many variables, including weather, shadows, and non-critical moving objects etc. To mitigate environmental factors, multi-modal sensors (multispectral, RGB, video, thermal, potentially LiDAR and RADAR) can be used to temporally visualize the same 3D space and provide synergistic information for more dimensions of discovery. An example embodiment employs Multi-Modal Fusion Neural Net architectures and methods, originally developed for DS2 (Data-driven Defeat System for sUAS) knowledge prototype using our generic, in-house data. Our fusion methods may incorporate information from spatially offset, yet temporally consistent 2D tensors (Thermal, Video Color and Multispectral data), with potential to extend to other 3D tensors (e.g., LiDAR), such as disclosed further below with regard to FIG. 21.

An embodiment of the Multi-Modal Fusion architecture calls a multi-modal Region Proposal Network (MMRPN), using pixel-based fusion, which spatially aligns and synergistically shares information via a projection function for pixel correspondence across different modalities. An example architecture may use middle fusion to reduce latency (compared with early or late fusion approaches) and deployed for near-real time situational awareness.

Preliminary motion analysis reveals that as data complexity increases, augmented inputs, such as background subtraction, stacking images, can be incorporated as a preprocessing step to facilitate trajectory analysis. Embodiments may use USACE-relevant datasets for implementation, evaluation, and ultimately software development. Options include evaluating toolkit suitability for Python packages with plugin support in view of transitioning technology, with increasing levels of capability. Models and methods for semi-automated information extraction and intelligence preparation with multi-sensor, multi-modal, and multi-temporal remotely sensed data may be employed. Model performance may be appraised using mAP, recall and loss metrics, as well as inference gifs for visual evaluation. Further, confusion matrices and ROC curves may be employed.

Example Advantages

The intuition that guides the novel, middle fusion approach is that rather than analyzing all proposals across all modalities simultaneously, or individually, the model only needs to analyze corresponding proposals across the modalities; that is, the model only considers the information provided by the other modalities regarding the same object. The use of RPNs not only improves model performance by optimizing the way information is shared to make a final classification, it also optimizes runtimes since only the RPNs need to be aligned in the network.

Feature extraction, using the FPN, is the first step of the network for dimensionality reduction, as disclosed above. A separate FPN is created for each modality irrespective of spatial resolution. Once images from each modality are passed through the respective FPN, the method then matches feature maps from different modalities with similar sizes. Due to the differences in camera resolution, similar sized feature maps are paired.

With FPNs extracted, an example embodiment of a novel Multi-Modal Region Proposal Network (RPN) aligns the multi-modal feature maps to make modality specific proposals. These are shared among modalities for synergistic learning. The model can propagate this shared information through the rest of the classification to optimize finalization of predictions. To highlight the value this provides, consider an example with two modalities: each modality has information vital yet still insufficient for classification. In the video color image, there is a flying object, yet the colors do not provide enough information to exactly classify the object. In the corresponding thermal image, thermal contrast is only distinguishable from background noise if it is already known that there is probability for an object to be at that exact location—this can be learned from the video color and vice versa such that combined information reinforces object detection.

With the modality specific proposals created, the Multi-Modal RPN utilizes the Projection Network to create proposal sets. A proposal set is a collection of "m" proposals, where "m" is the number of modalities. The network utilizes the projection function to project every proposal in each modality onto every other modality for final multimodal classification. The model ranks these proposals (using the sum of confidence rating) to filter out bad/inaccurate proposals and ensure only viable proposals are sent to the final predictor. The top ranked proposal sets make the final decision using all possible dimensions of information. Model performance is appraised using mAP, recall and loss metrics, as well as inference gifs for visual evaluation. Confusion matrices and ROC curves may be employed.

According to an example embodiment, user input may be received by a system and may be used to change/select modality-specific sensors employed by the system for use in predicting existence of a feature (e.g., object) in a scene. The user input may identify: an environmental condition that may involve many variables (factors—atmospheric condition, amount of daylight/sunlight, trees, buildings, urban settings, weather, shadows, non-critical moving objects, etc. To mitigate such environmental factors impact for detecting a feature in a scene, an example embodiment may employ multiple, modality-specific sensors and then select appropriateness of such sensors based on extenuating conditions, or may recommend optimal sensor configurations for use in observing a feature, such as an object in a scene. An example embodiment of a computer-implemented method for operating a system for observing same is disclosed below with regard to FIG. 4.

Figure 4:
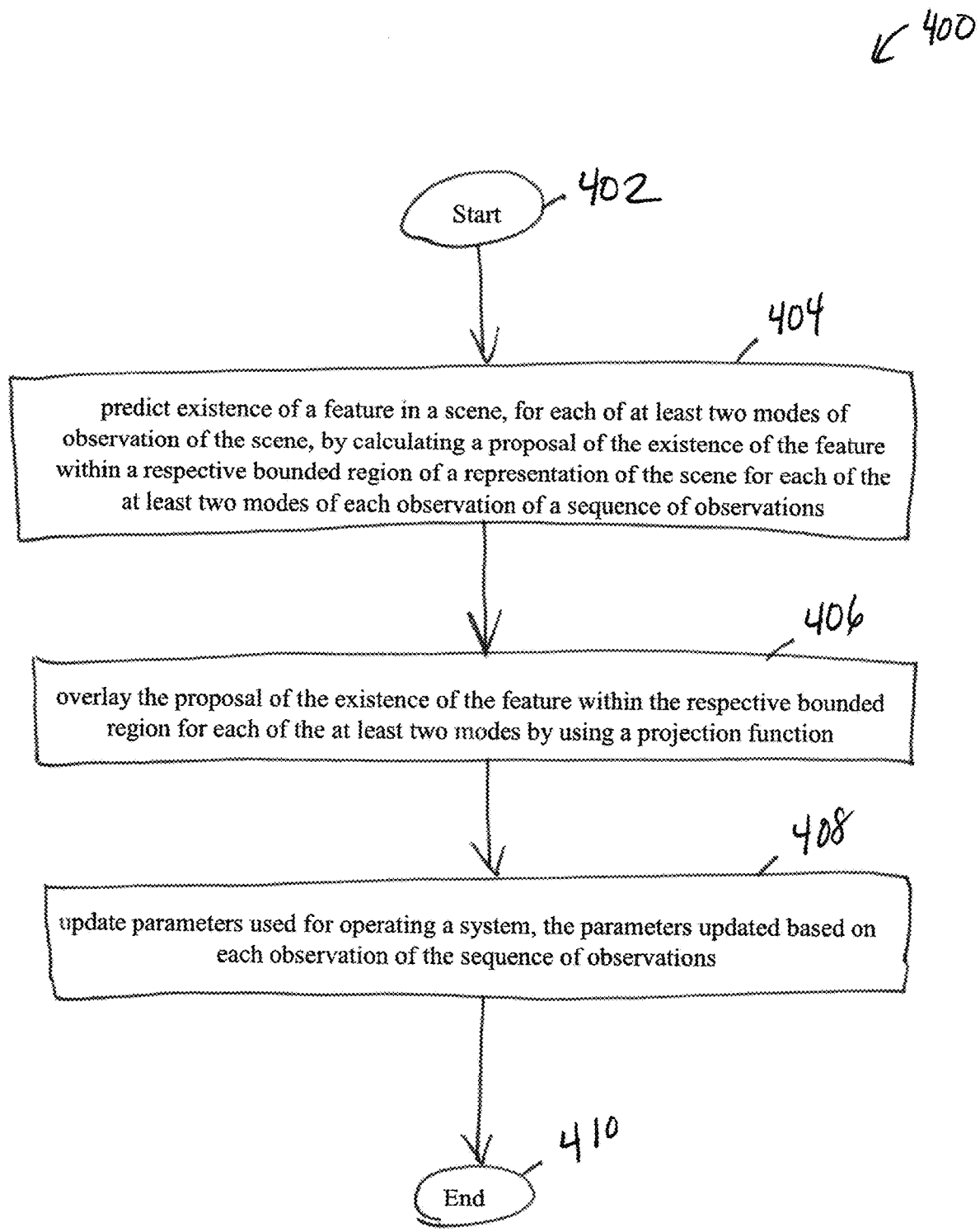
FIG. 4 is flow diagram of an example embodiment of a computer-implemented method for operating a system observing a feature in a scene.

FIG. 4 is a flow diagram of an example embodiment of a a computer-implemented method 400 for operating a system observing a feature in a scene. The computer-implemented method begins (402) and comprises predicting existence of the feature in the scene for each of at least two modes of observation of the scene (404). The predicting is performed by calculating a proposal of the existence of the feature within a respective bounded region of a representation of the scene for each of the at least two modes of each observation of a sequence of observations. The computer-implemented method further comprises overlaying the proposal of the existence of the feature within the respective bounded region for each of the at least two modes by using a projection function that shares information between or among modes to generate a corresponding fused predicted existence of the feature for each of the at least two modes of each observation (406). The computer-implemented method further comprises updating parameters used for operating the system (408). The parameters are updated based on each observation of the sequence of observations as a function of: (i) the predicted existence of the feature for at least one mode of the at least two modes, (ii) the corresponding fused predicted existence of the feature for the at least two modes, or (iii) a combination of (i) and (ii). The computer-implemented thereafter ends (410) in the example embodiment.

An embodiment of the computer implemented method 400 may be referred to herein a multi-modal fusion method or fusion method and may be implemented in hardware, firmware, or software. If implemented in software, the software may be stored on a non-transitory computer readable medium and loadable by a processor that executes in accordance with instructions therein. Iterations of the method can extend deep learning with supplementary training and can adjust to other sources, and a hierarchical fusion approach taken by the method for recognizing objects can be employed for tracking targets in real-time and in challenging conditions, as disclosed further below. Further details regarding the fusion method are disclosed below As disclosed above, a new projection function ensures spatial alignment of objects between data modes that improves accuracy and precision. The fusion method also optimizes performance in how information is shared among modalities. According to an example embodiment, an auxiliary module may be employed to improve feature detection for small objects as disclosed above. Generic formulation of a fusion prototype (DS2) was possible by building on internal Kostas Research Institute (KRI) capability. Development of DS2 proceeded by collecting unique data leveraging the KRI outdoor drone cage to feed an ML-AI many level neural network. The cage offers distinct advantage for successful ML/AI implementation since it enables acquisition of clean data feeds that drive model performance. Generic implementation helps to determine that the correct task is being solved before expanding the size of the training datasets.

As disclosed above, object detection and classification are complex tasks affected by many variables, including weather, shadows, and non-critical moving objects, etc. To mitigate such environmental factors data from multiple, modality-specific sensors—multispectral, video, thermal—may be used. These sensors temporally visualize the same space and provide synergistic information to allow more dimensions of discovery than a single modality and under a greater range of conditions.

KRI's proof-of-concept, novel Multi-Modal Fusion Neural Net architectures and methods were collected using a new hardware platform called the SuperSensor, created by MatrixSpace. An example embodiment of a fusion method incorporates information from spatially offset, yet temporally consistent, 2D tensors (Thermal, Video Color and Multispectral data) with potential to extend to other tensor types (e.g., LiDAR, SDR, etc.). An example embodiment of a novel Multi-Modal Fusion architecture disclosed herein implements a modified Region Proposal Network (RPN) referred to as a Multi-Modal Region Proposal Network (MMRPN). The network spatially aligns and synergistically shares information using a novel projection function to establish pixel correspondence across different modalities with a middle fusion approach as disclosed above.

The architecture adapts a 2-stage detector framework using Faster R-CNN with FPN (an auxiliary Feature Pyramid Network) and RPN. This base code is conceptually and structurally adapted to include the new projection function and to include multimodality. The projection function spatially aligns temporally consistent multi-modal data and is a unique contribution of disclosed herein. As disclosed above, the projection function converts coordinates from one modality to coordinates of the corresponding location in another modality to match RPN space.

While simple in derivation, the function is nontrivial given the asynchrony of multimodal data. Proven value of fusing multiple modes of data using an example embodiment of a novel Multi-Modal Region Proposal Network (MMRPN) is highlighted in reduced false positive rates over single modality detections. Metrics also reveal the novel fusion model outperforms individual modality models, in all evaluation metrics, for each modality, and that pretrained fusion models outperform the imageNet pretrained fusion models. Further, fusion with thermal leads to a 12% improvement in the multispectral modality as per the F1 score. Conditions for successful execution of the NN use synergistically collected data with a shared field of view. The system is designed for edge computing to prepare the models for extended system fusion and collaboration with other systems.

Motion Detection Networks

Motion Analysis is a field of Computer Vision used for processing many sequential frames of data to highlight motion between the frames. The tasks of motion analysis and capture include a) initialization; b) tracking; and c) recognition (Moeslund, et al., (2001). "A Survey of Computer Vision-Based Human Motion Capture," ELSEVIER, 81 (3), 231-268. doi: https://doi.org/10.1006/cviu.2000.0897). Briefly, initialization describes the first exposure to data, tracking the prediction of motion, and recognition the final motion classification. Traditional object detection methods, such as YOLO (Redmon, et al., (2016). "You Only Look Once: Unified, Real-Time Object Detection," Retrieved from https://arxiv.org/abs/1506.02640) and Faster RCNN (Ren, et al., (2016). "Faster R-CNN: Towards Real-Time Object Detection with Region Proposal Networks," Retrieved from https://arxiv.org/abs/1506.01497), developed exclusively for object detection, do not consider previous data when making real-time decisions.

Techniques from motion detection should be paired with such Deep Learning methods to allow approximations of complex functions (Chalapathy and Chawla, (2019). "Deep Learning for Anomaly Detection: A Survey," ArXiv.org, 23 January. Retrieved from arxiv.org/abs/1901.03407). To evaluate motion/tracking, an example embodiment uses sequential data. Motion analysis techniques, such as background subtracted images disclosed below with regard to FIG. 5—or stacked images, can then test the model's ability to track objects that become occluded and to distinguish between types of moving objects, i.e., a drone or background motion.

Figure 5:
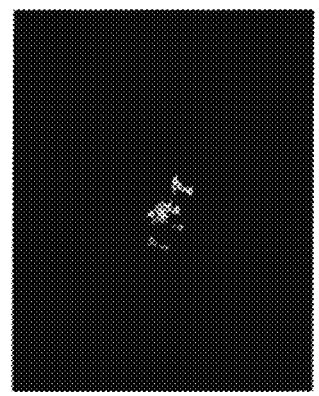
FIG. 5 is an image of an example embodiment of augmented thermal data for motion analysis.

FIG. 5 is an image of an example embodiment of augmented thermal data 500 for motion analysis that shows the result of applying the Background Subtracted Image (BSI) method. An analysis of preliminary results revealed that while non-augmented data currently outperform motion analysis variations, the Background Subtracted and Stacked networks might perform better as complexity of data increases. Such approach was not pursued, however, deferring instead to MatrixSpace's 360 LiDAR tracking system to provide motion analysis and tracking with potential to later use the tracks to refine and improve object detection classification.

Optical Datasets Used

Electro-Optical (EO) datasets are used to detect drones derived using reflective visible and near InfraRed (IR) wavelengths, and longer thermal wavelengths via emissive properties. Visible images are known to provide high contrast and rich details in clear daylight with a direct line of sight. Dark conditions and atmospheric scattering, and/or cloud cover hinder detection. Thermal IR, while lower in spatial resolution and contrast, has strong anti-interference capabilities and is impervious to ambient light conditions; thus, it can provide information day and night. Multispectral data (blue (450 nm), green (550 nm), red (650 nm), NIR1 (750 nm), NIR2 (850 nm), and NIR3 (950 nm)) may provide some information concerning the target surface material, so be useful when discriminating from other material types such as vegetation or buildings (Qu, Y., et al., (2017). "Active Multimodal Sensor System for Target Recognition and Tracking," Sensors (Basel, Switzerland), 17 (7), 1518.7). A hypothesis herein is that when used together, each sensor can feasibly improve object detection in a complementary manner, where signatures in one mode may augment low, confused, or absent signatures in other modes (Himmelsbach et al., 2008, "LIDAR-based 3D Object Perception," Velodyne Lidar, p. 1-7.; Cho et al., 2014, "A multi-sensor fusion system for moving object detection and tracking in urban driving environments," Proceedings of the 4 IEEE International Conference on Robotics and Automation (ICRA); Hong Kong, China. 31 May-7 Jun. 2014; pp. 1836-1843) affording continued drone detection irrespective of extenuating circumstances.

Object Detection Architecture

As disclosed above, there are two primary architectures that exist in the field of object detection called one- and two-stage detectors. Single-stage detectors, such as YOLO (You Only Look Once; Redman, et al., 2016, "You Only Look Once: Unified, Real-Time Object Detection," Retrieved from https://arxiv.org/abs/1506.02640), Retina-Net (Lin et al., 2018, "Focal Loss for Dense Object Detection," 10 May, retrieved from arxiv.org/abs/1708.02002), and SSD (Singe Shot MultiBox Detector) treat object detection as a simple regression problem. They take an input image to learn class probabilities and bounding box coordinates. The potential bounding box locations are called anchor boxes and are pre-determined prior to runtime. One-stage detectors can run inference quickly. However, since the location of each cell is fixed, overall accuracy is reduced. Two-stage detectors, such as Faster R-CNN (Region-based Convolutional Neural Networks; (Ren et al., 2016, "Faster R-CNN: Towards Real-Time Object Detection with Region Proposal Networks," Retrieved from https://arxiv.org/abs/1506.01497) or Mask R-CNN, first use a Region Proposal Network to generate proposals (regions of interests), then learn the class probabilities and bounding box coordinate in the second stage. With an RPN approach, predetermined boxes, called "anchor boxes." are placed at every pixel position in the feature extractor's output feature maps. The RPN generates deltas for key regions within the feature map for alignment, enabling more accurate predictions.

In the case of the Faster R-CNN feature extraction component, also known as a "backbone," a ResNet (PyTorch) network is used for dimensionality reduction. ResNet networks commonly comprise of either 50 layers or 101 An auxiliary module—called a Feature Pyramid Network (FPN)—may be added to the backbone component to further improve feature extraction (Wu et al., 2019, Detectron2 (Version 0.2.1) [Computer software]. Github/detectron2) enabling the accurate detection of small objects. An example embodiment may build upon same. Based on improvements observed in early results, ResNet is favored over ResNext and an example embodiment may use Faster R-CNN with 101 layers for increased depth for non-limiting example.

In such an architecture, the steps may be: 1) the FPN backbone to extract key features from input data; 2) these features are passed to the RPN to identify potential regions of interest within the feature maps; 3) the ROI Heads use these proposed regions of interest to make final bounding box predictions. Presently, this is a popular approach for single modality feature extraction methods owing to its reliability, repeatability, ease of use and accuracy. Further, Facebook's AI Research (FAIR) open-source object detection repo assembles a complete implementation of the Faster R-CNN architecture with a ResNet101+FPN backbone (Wu et al., 2019, Detectron2 (Version 0.2.1) [Computer software]. Github/detectron2). New multimodal fusion approaches are disclosed below.

Fusion Network Architecture

As a base for both our individual modality object detection models, and an example embodiment of fusion network architecture disclosed herein, the Faster-RCNN architecture with a 101-layered Feature Pyramid Network was employed, adapting and modifying the FAIR Detectron2 codebase. The architecture is modified conceptually and structurally-conceptually by the introduction of a projection function, and structurally through the creation of new code to accommodate multimodality. As described above, the base network is constructed with three major components: the feature extraction FPN, the Region Proposal Network (RPN), and the Regions-of-Interest (ROI) Heads. These components are amended to: a) include multiple backbones (FPNs) for each modality (where each backbone specializes in one modality); b) multiple RPNs for each modality; c) a new projection function for projection of modality specific proposals into other modality spaces; d) pairing corresponding proposals across all modalities; and e) including multiple output ROI heads for each modality (where each ROI head specializes in each modality). The main intuition that guides this work is a novel middle fusion approach, disclosed below with regard to FIG. 6.

Figure 6:
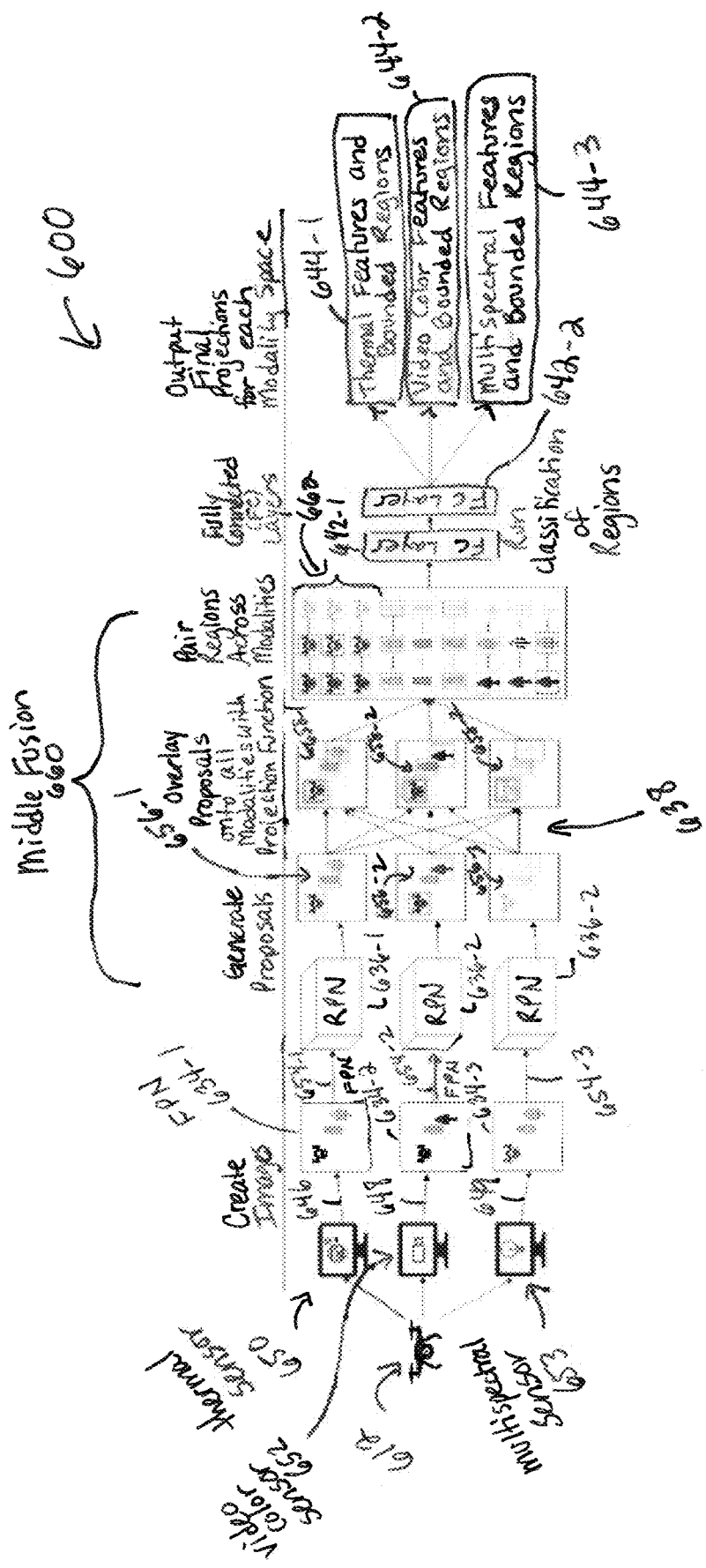
FIG. 6 is a schematic diagram of another example embodiment of a multi-modal fusion model architecture that may be used to perform methods disclosed herein.

FIG. 6 is a schematic diagram of an example embodiment of a multi-modal fusion model architecture 600. The architecture 600 may be implemented by a system and used to perform methods disclosed herein. In the architecture 600, the lower neural net's feature pyramid networks (FPNs), namely the FPN 634-1, FPN 634-2, and FPN 634-3, each extract features from one modality. For example, the FPN 634-1 extracts features from thermal data 646 collected via a thermal sensor 650 of a multi-modal system 612 while the FPN 634-2 extracts features from video color data 646 collected via a video color sensor 652 of the multi-modal system 612, and FPN 634-3 extracts features from multispectral data 649 collected via a multispectral sensor 653 of the multi-modal system 612.

Each FPN (634-1, 634-2, 634-3) passes respective feature maps (654-1, 654-2, 654-3) to a respective RPN (636-1, 636-2, 636-3). The RPNs identify respective potential regions of interest (656-1, 656-2, 656-3) (proposals) within the respective feature map (654-1, 654-2, 654-3) received. A new projection function 638 for projection projects such modality specific proposals into other modality spaces to create a proposal set for each modality (658-1, 658-2, 658-3). Each proposal set is a collection of "m" proposals, where "m" is the number of modalities, namely three (thermal, video color, multispectral) in the non-limiting example of FIG. 6.

Such modalities incorporate some overlapping field of view. Spatial misalignment is expected and corrected through the projection function 638. The middle fusion section 660 may be referred to as a Multi-Modal RPN (MMRPN) and aligns the corresponding proposals by pairing 662 regions across the modalities. The architecture 600 further includes a fully connected (FC) network including FC layers (642-1, 642-2) for synthesizing the predictions, that is, a thermal output 644-1 with thermal features and corresponding bounded regions, a video color output 644-2 with video color features and corresponding bounded regions, and a multispectral output 644-3 with multispectral features and corresponding bounded regions.

As such, in the fusion network architecture 600, each modality has its own FPN and RPN. Feature extraction is performed on each modality's input image using the modality specific FPN backbone. From here, feature maps, created by the FPN, are input to the modality specific RPN. Each RPN (636-1, 636-2, 636-3) then produces several modality specific proposed areas of interest that are used for middle fusion 660 by way of the novel projection function 638, described further below.

With the modality specific proposals created, the multimodal RPN (MMRPN) of FIG. 6 utilizes a set of projection functions to create proposal sets (658-1, 658-2, 658-3) as disclosed above. Using middle fusion, only corresponding RPNs across the modalities are simultaneously analyzed. An example embodiment of a method, disclosed herein, thus optimizes the amount of relevant information shared during fusion to make final determinations, in contrast to total information sharing employed by other methods. Model performance may be appraised using mean average precision (mAP), recall, loss and F1 metrics, as well as inference gifs for visual evaluation.

Novel Projection Function

Continuing with reference to FIG. 6, with modality specific proposals generated by the RPNs (656-1, 656-2, 656-3), the novel Multi-Modal Region Proposal Network (MMRPN) architecture 600 uses a set of projection functions 638 to project proposals from one modality space into other modality spaces. The projection function 638 spatially aligns temporally consistent multi-modal data and is a unique contribution disclosed herein. The projection function 638 converts coordinates from one modality to coordinates of the corresponding location in another modality to match RPN space. While simple in derivation, the projection function is nontrivial given the asynchrony of multimodal data. Asynchrony includes distinct sensor specifications such as aspect ratio, frames per second (FPS), spatial resolution, and offset field of views (FOV).

Owing to these variations, the same coordinates in different modalities create spatially offset RPNs and a projection function can be employed for alignment of same. Given the nature of camera optics (Yu et al., 2004, "General Linear Cameras," In: Pajdla T., Matas J. (eds) Computer Vision-ECCV 2004. ECCV 2004. Lecture Notes in Computer Science, vol. 3022. Springer, Berlin, Heidelberg. https://doi.org/10.1007/978-3-540-24671-8_2), an example embodiment of a projection function employed in an embodiment herein may assume that a linear mapping relationship exists between the corresponding RPNs across pairs of modalities, after input data are matched by timestamp, such as disclosed below with regard to FIGS. 7A-1 through 7A-8 and FIGS. 7B-1 through 7B-8. To identify the correction projection function, temporal misalignments are verified and images with the closest timestamps are used across modalities.

Figure 7:
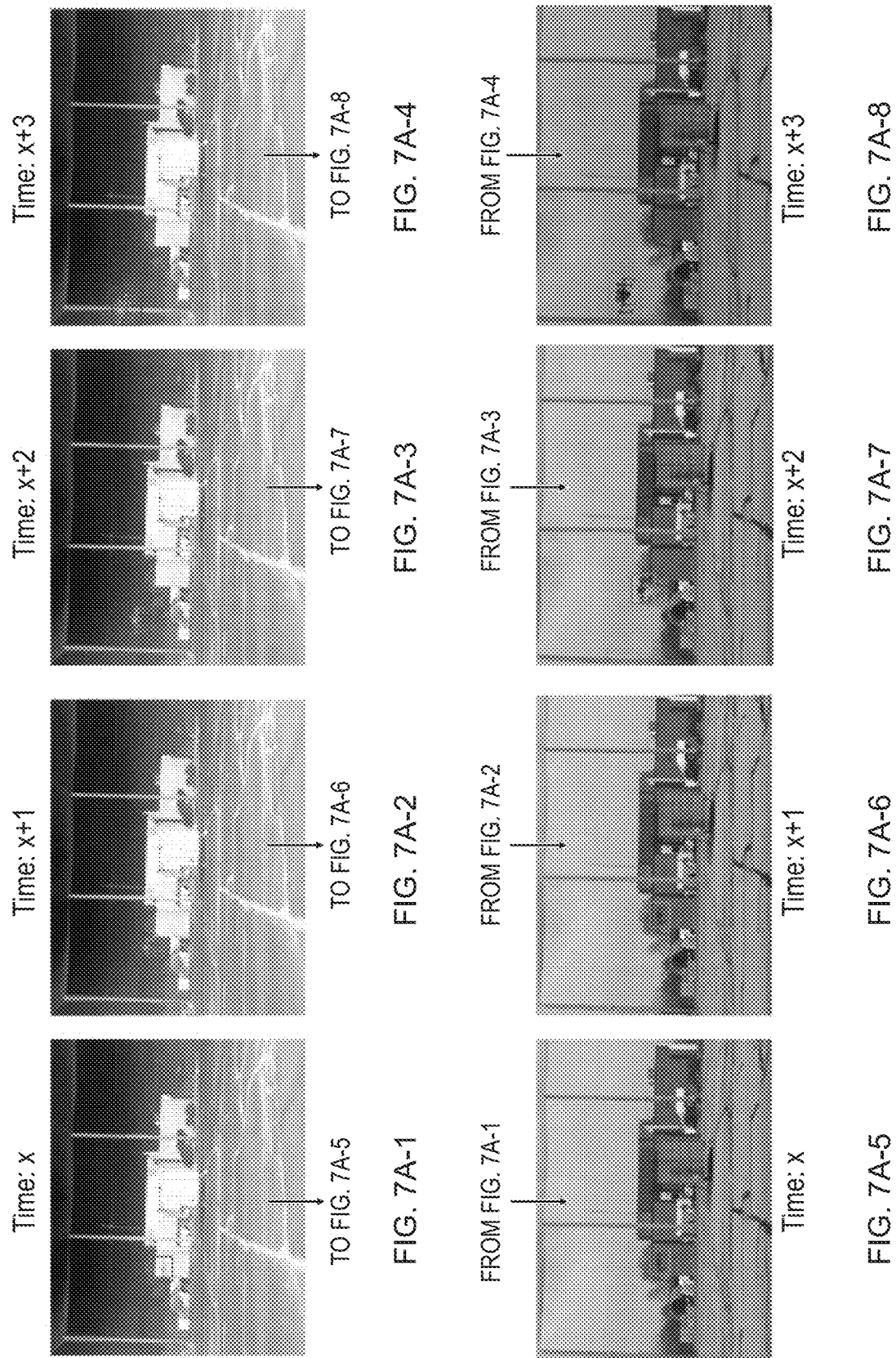

FIGS. 7A-1 through 7A-8 are images demonstrating an example embodiment of matching by timestamp. Such matching may be included as part of pre-processing performed by a method or system disclosed herein. The images of FIGS. 7A-1, 7A-2, 7A-3, and 7A-4 are produced via a first modality at time x, x+1, x+2, and x+3, respectively. The images of FIGS. 7A-5, 7A-6, 7A-7, and 7A-8 are produced via a second modality at time x, x+1, x+2, and x+3, respectively. The images of FIG. 7A-1 through 7A-4 are matched to images of FIG. 7A-5 through 7A-8 based on time x, x+1, x+2, and x+3 associated with same, respectively.

FIGS. 7B-1 through 7B-8 are images demonstrating an example embodiment of matching by shifted timestamp (shift=n=1). Such matching may be included as part of pre-processing performed by a method or system disclosed herein. The images of FIGS. 7B-1, 7B-2, 7B-3, and 7B-4 are produced via the first modality at time x+n, x+1+n, x+2+n, and x+3+n, respectively. The images of FIGS. 7B-5, 7B-6, 7B-7, and 7B-8 are produced via the second modality at time x+n, x+1+n, x+2+n, and x+3+, respectively. The images of FIG. 7B-1 through 7B-4 are matched to images of FIG. 7B-5 through 7B-8 based on time x+n, x+1+n, x+2+n, and x+3+n associated with same, respectively.

Upon temporal matching of images, the projection function can be utilized. According to an example embodiment, bounding boxes may be used to store the sets of pixel coordinates that are used in projection. A standard parameterization, XYXY ([Xmin, Ymin, Xmax, Ymax], where [Xmin, Xmax] and [Ymin, Ymax] defines the minimum and maximum horizontal/vertical pixel values for the bounding box, respectively, may be employed. The matrices for the projection function are disclosed below with regard to FIG. 8.

Figure 8:
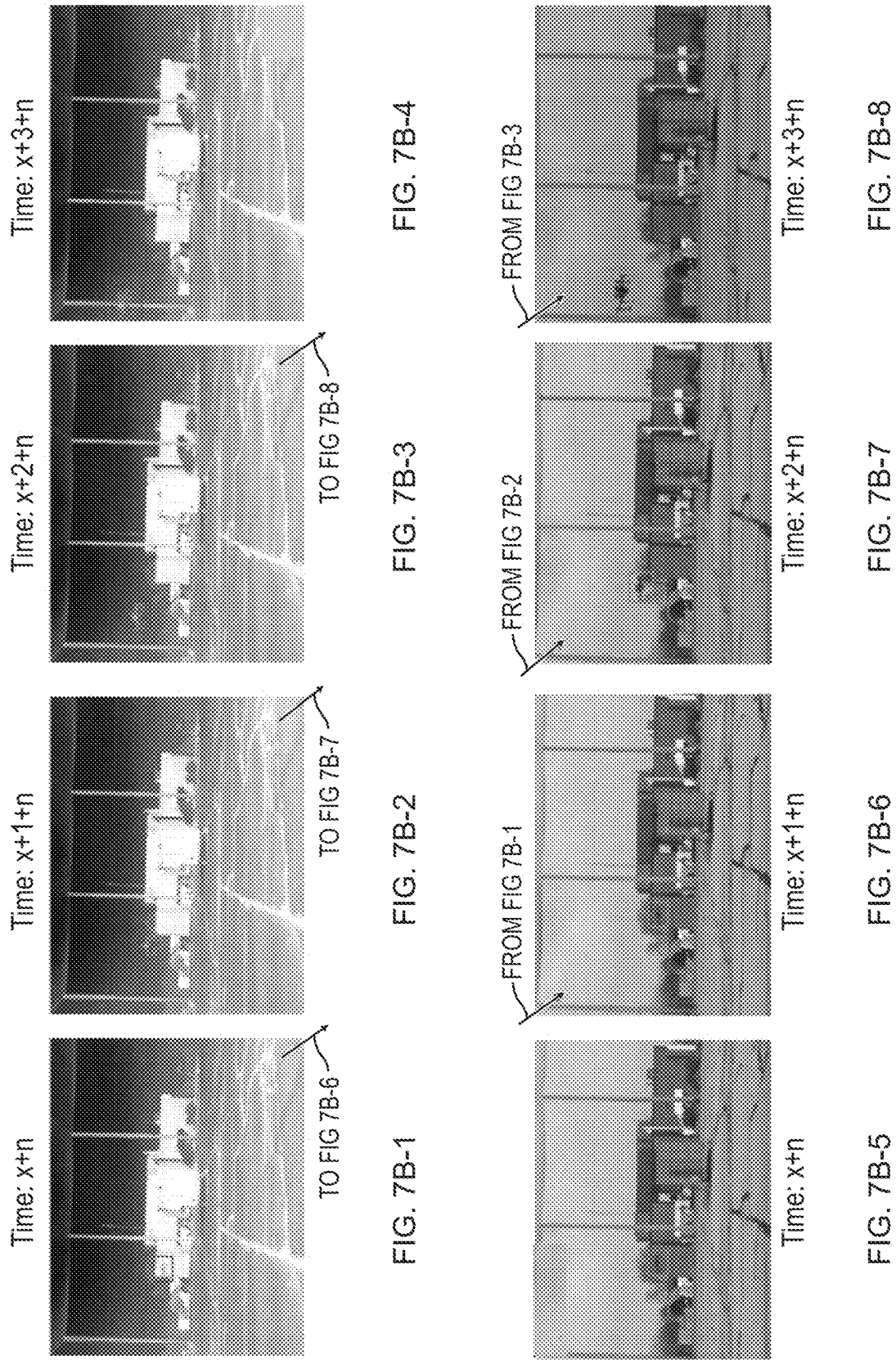

FIG. 8 is a representation of an example embodiment of matrices 800 for a projection function. For the $X_{Thermal}$, $Y_{Thermal}$ matrix, the ith row of the matrix is the $[X_{min}, Y_{min}, X_{max}, Y_{max}]$ bounding box information for the $i^{th}$ thermal image. For the $X_{VC}, Y_{VC}$ matrix, the ith row of the matrix is the $[X_{min}, Y_{min}, X_{max}, Y_{max}]$ bounding box information for the $i^{th}$ video color (VC) image.

To train an example embodiment of the feed-forward projection function, a closed form multi-variate linear regression may be performed and such regression produces matrices that convert bounding boxes from one modality to another. To approximate the assumed linear relationship, an example embodiment utilizes a constant term in the linear fitting. The addition of the constant means the operation is not bidirectional, thus, two different matrices per modality pair are used. Projected proposals can then be paired with the original proposal to create a proposal set that includes the same proposal image area in all modalities, as disclosed below with regard to FIG. 9. According to an example embodiment, a proposal set is a collection of "m" proposals, where "m" is the number of modalities. An example embodiment of a model disclosed herein can propagate this shared information through the rest of the NN to optimize finalization of predictions.

Figure 9:
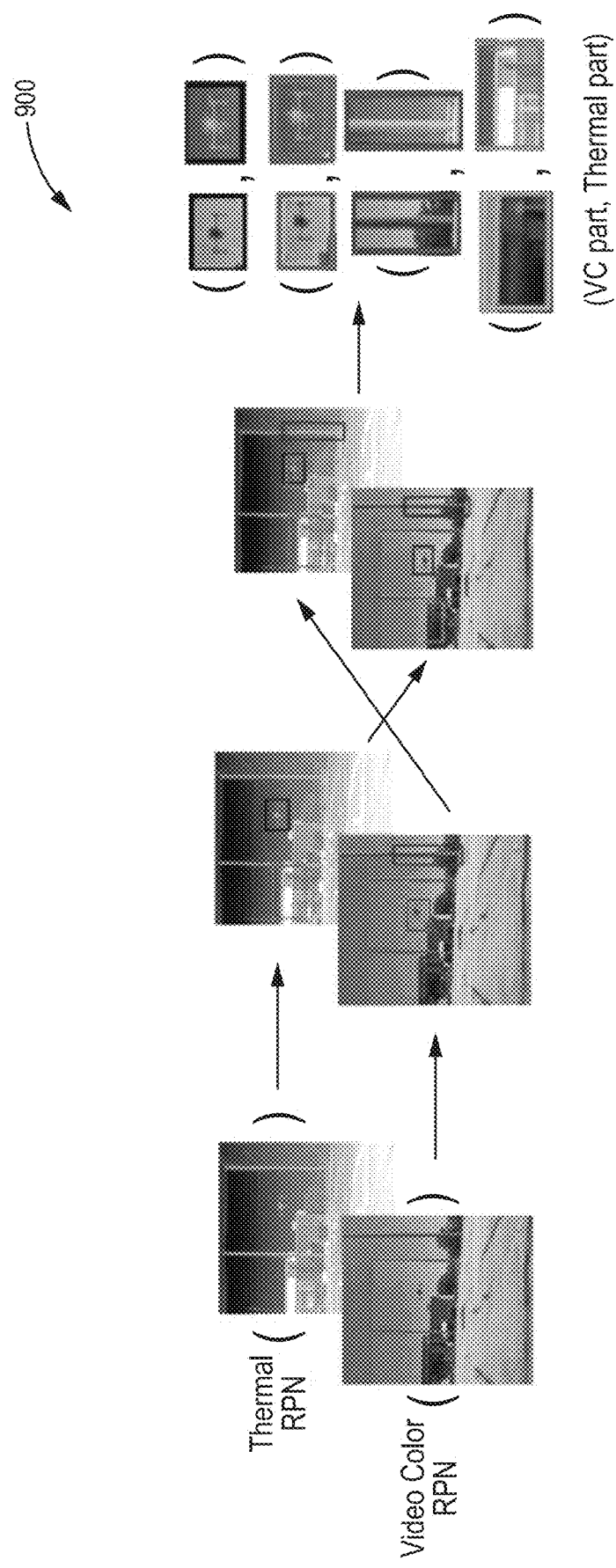
FIG. 9 is a pictorial representation of an example embodiment of a multi-modal region proposal network (MMRPN) projected proposal process for thermal and video data.

FIG. 9 is a pictorial representation of an example embodiment of a multi-modal region proposal network (MMRPN) projected proposal process 900 for thermal and video data.

Data Preprocessing

Example embodiments of advanced processing methods disclosed herein were developed based on collection of in-house, generic data that leveraged KRI's outdoor drone cage facilities. Since data collection and analysis occurred in tandem, an experimental advantage for successful ML/AI implementation was gained. It is useful for training data to be of high-quality to infuse human intelligence into the machine learning process. It is also useful for features to be efficient, robust, and physically interpretable to obtain a machine processable data representation that contains the key properties of the target without overfitting. Machine learning methods learn behavior by analyzing training data supplied to them; thus, an example embodiment disclosed herein employs training data acquired for all modalities, under different conditions (night/day, seasonal, weather) with sufficient environmental variance, such as illumination variation and shadows, scaling (e.g., slant left, slant right, face forward), etc., for non-limiting examples. For example, during data collection, it was discovered that it would be useful to balance drone size bias, disclosed below with regard to FIG. 10A and FIG. 10B.

Figure 10B:
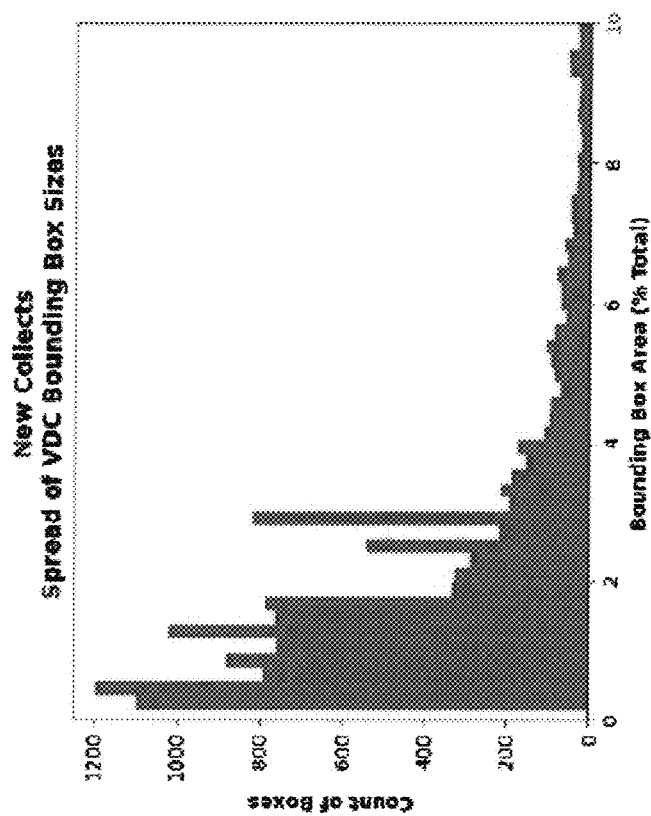
FIGS. 10A-B are graphs of example embodiments of drone size bias.
Figure 10A:
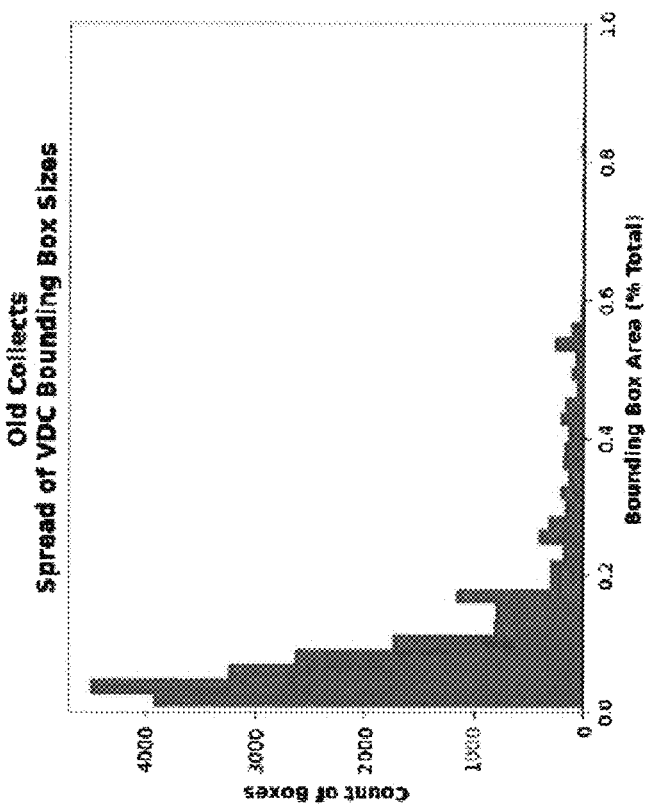

FIG. 10A and FIG. 10B are graphs 1000-A and 1000-B, respectively, of example embodiments of drone size bias, where smaller drones are captured in greater amounts than larger drones. The graph 1000-A shows initial (older) collections and the graph 1000-B shows more recent collection. FIG. 10A illustrates that all of the original bounding boxes were less than 1% of the entire image, resulting in a dataset that was skewed towards very small, or far away, drones. This observation was useful in governing what the next collections should look like, to balance drone size, such as shown in the graph 1000-B of FIG. 10B, and to ultimately drive improved model performance. Through in-house data collection, it was possible to determine that the correct task was being solved before expanding the size of the training datasets.

Scalabel was chosen for labeling two-dimensional data training data in the datasets. Scalabel is an open-source web annotation tool. Up to 700 images were simultaneously labelled at a time to reduce loading times and improve overall efficiency. The Scalabel program allows a user to label two frames, then performs a simple linear interpolation to label the frames in between them. With this system, if the drone is moving at a roughly constant speed, the user can reduce the number of frames that require manual labeling.

Using Scalabel, a user can place a bounding box around a drone in frame one and move the same bounding box to a different location in frame ten. The frames between one and ten will now have a bounding box on them that results from linear interpolation between frames 1-10. This gives the user (labeler) the ability to label a significantly lower number of frames than if they had to label manually.

HDF5 and Index Generator

Annotated data collects may be exported from the Scalabel server and then converted and stored as HDF5 files, where each HDF5 file contains all the information from a given collect, along with the timestamps of each image and metadata regarding drone type. To create pairs of data that can be passed to either the Multi-Modal Fusion Network or the Projection Network it is useful to find the matching images across modalities based on timestamps prior to creating the datasets.

An example embodiment semi-automates labeling using Scalabel and stores the ground-truth information in HDF5 files. Scalabel gives the option to tag bounding boxes with a specific class and specific attributes for easy classification of different objects and sub-classes of object classes. The HDF5 file contains the annotated information from a given collect, along with the timestamps for each image and metadata regarding drone type. The HDF5 file format is chosen for its self-describing and consistently organized properties that facilitate ease of use. An in-house Index Generator is used to search for images with corresponding timestamps across modalities.

According to an example embodiment, sequential actions taken with regard to an ML/AI implementation disclosed herein may include data collection, data labeling, configuring data for training, training the model, and testing the object detector, as disclosed below.

1. Data collection—to meet criteria, as described above, and with regard to FIG. 11, disclosed below, that shows the cleanest data collects selected for ML/AI implementation.

FIG. 11 is table 1100 with example embodiments of raw data used in ML/AI, where the total is the collection of images both with a drone in a frame and without one. Non-null is the number of images that contain a drone and the images used in the model.

2. Data Labeling—performed to identify drone examples using Scalabel for non-limiting example.

Figures 12A, 12B, 12C:
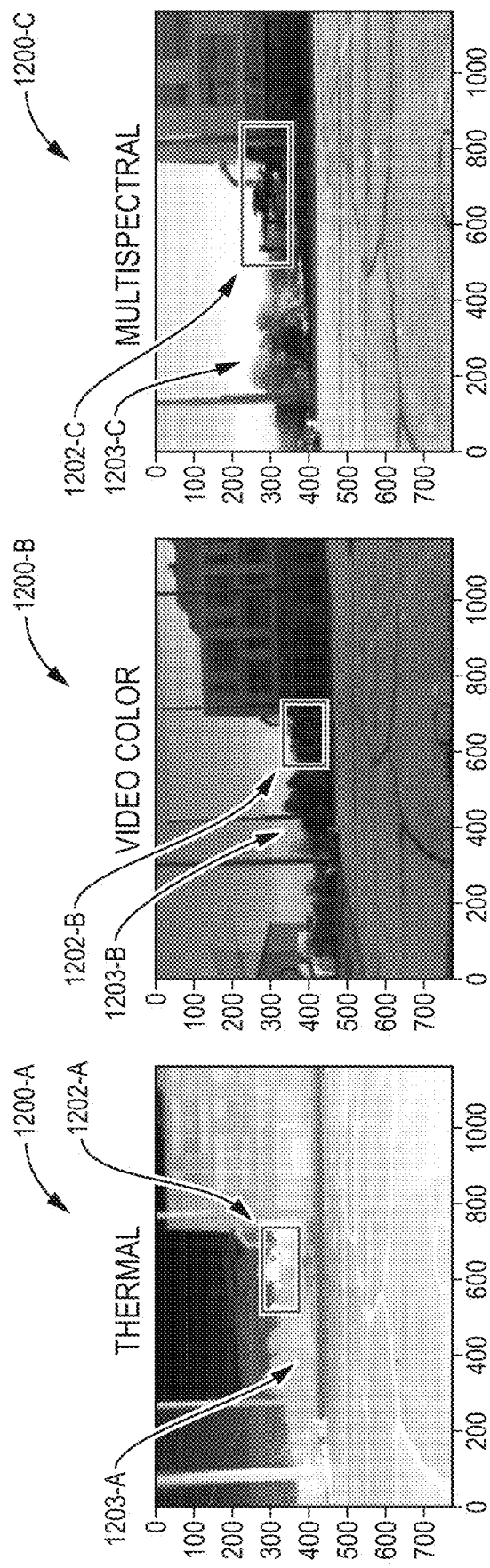
FIGS. 12A, 12B, and 12C are images of example embodiments of a same drone seen in simultaneously collected thermal data, video data, and multispectral data, respectively.

It is useful for the data labeling to be performed in a way that captures sufficient variance, and includes a mix of hybrid signals. For example, sometimes legs of a drone are visible, in other cases they are not. FIGS. 12A, 12B, and 12C are images of example embodiments of such hybrid signals that may be used in training.

FIG. 12A is a thermal image 1200-A of an example embodiment of a drone 1202-A seen in thermal data.

FIG. 12B is a video color image 1200-B of an example embodiment of a drone 1202-B seen in video color data.

FIG. 12C is a multispectral image 1200-C of an example embodiment of a drone 1202-C seen in multispectral data. In the images (1200-A, 1200-B, 1200-C) of FIGS. 12A, 12B, and 12C, the drone 1202-A, drone 1202-B, drone 1202-C) is the same drone seen in simultaneously collected thermal data, video data, and multispectral data, respectively. In the images (1200-A, 1200-B, 1200-C) of FIGS. 12A, 12B, and 12C, significant vegetation (1203-A, 1203-B, 1203-C) is seen in the background.

3. Configuring data for training

Configuring the data for training may include: resizing images, aligning time lags between modalities, flipping, removing rows of data without annotated boxes, compressing HDF5 files, correcting for frame per second (FPS) inconsistencies, splitting aligned rows into train and test arrays, and writing to train and test HDF5 files with chunk size equal to batch size for non-limiting examples.

4. Training the model

According to a non-limiting example embodiment, a train test 70:30 split may be used, such as disclosed below with FIGS. 13A-D. The number of training iterations is traditionally large to allow the learning method to run until error from the time the model is minimized; training continues while errors decrease.

FIGS. 13A-D are tables with example embodiments of numbers of training images and testing images for each sensor modality and combination of modalities. Specifically, FIG. 13A is table 1300-A of an example embodiment of train test splits for video color and thermal modalities. FIG. 13B is table 1300-B of an example embodiment of train test splits for video color and multispectral modalities. FIG. 13C is table 1300-C of an example embodiment of train test splits for thermal and multispectral modalities. FIG. 13D is table 1300-D of an example embodiment of train test splits for video color, thermal, and multispectral modalities.

5 Testing object detector

Figure 14:
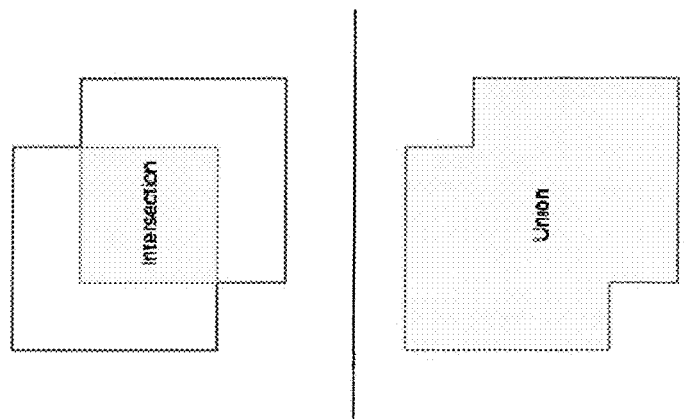
FIG. 14 is a schematic representation of an example embodiment of an intersection over union (IoU) metric.

In machine learning, the Intersection over Union (IoU) metric defines the correctness of a bounding box for object detection. FIG. 14, disclosed below, is a schematic representation of an example embodiment of the IOU metric.

FIG. 14 is a schematic representation 1400 of an example embodiment of the IoU metric. The schematic representation 1400 represents how the IoU metric calculates true positives and false positives. Specifically, IOU defines a ratio between the intersection and the union of predicted boxes, and the ground truth boxes. To evaluate models disclosed herein, the metrics provided by COCOApi (Lin e al., 2015, "Focal Loss for Dense Object Detection," 10 May, retrieved from arxiv.org/abs/1708.02002.) were used. These provide an assessment of the accuracy of detection for different IoU thresholds, e.g., if the IoU threshold is 0.5, a detection with an IoU >=0.5 is considered a True Positive (TP), otherwise it is considered a False Positive (FP). According to an example embodiment, the default IoU may be an average precision—AP (0.5:0.9)—which averages AP50, AP55, AP60, . . . , AP90 to describe the percentage of correct predictions. Average precision values fall between 0 and 1, where higher values, means fewer false positives.

Other metrics retrieved for evaluation may include loss, recall, and F-score. Loss is the number indicating how well the model can predict. If the model's prediction is perfect, the loss is zero; otherwise, the loss is greater. Loss can be improved in subsequent iterations using new training data and/or applying different weights to the model. Recall is calculated from the number of objects correctly detected, divided by the total number of detections, that is: Recall=TP/(TP+FN). High recall values mean high precision/sensitivity of the model and, with regard to an example embodiment, means detecting the drone often. The F-score (F1) is the harmonic mean of average precision (AP) and average recall (AR). The highest possible value is 1. A higher value means that, as recall increases, AP stays high, as defined by: F1=2*((AP*AR)/(AP+AR)). Further, a metric for evaluation may include the inference time spent per image (s/img), where a lower s/img value means the model performs inference faster.

Results

Data Collection

A learning curve was experienced with regard to data collection. For example, over the course of a few months, it was found to be useful to accommodate sensor upgrades and introduce collection adjustments, including for an initial drone size imbalance in the training data, disclosed above with regard to FIGS. 10A-B. The cleanest data feeds are captured in a final 3 collects. Two collects used the DJI® Matrice 100 drone and the other an AUTEL® EVO® drone for non-limiting example. According to an example embodiment, even distributions of all drone types used for training may be collected, since some loss was observed in the model detection and classification performance when introducing the solitary AUTEL EVO collect, as shown in FIGS. 15A-B, disclosed below. It is possible that the AUTEL EVO's unique shape and bright orange color may also impact performance.

FIGS. 15A-B are tables with example embodiments of test results. Specifically, FIG. 15A is a table 1500-A of test results of evaluation metrics trained on video color images with and without the AUTEL EVO collect. FIG. 15B is a table 1500-B of test results of evaluation metrics trained on thermal images with and without the AUTEL EVO collect. The results show a reduction in performance when introducing the EVO; thus, even collections of multiple drone types is recommended.

Temporal Alignment

Given that NN fusion depends on temporal alignments across sensors and is how the projection function calls data, temporal stamps were checked for all datasets to ensure they are matched, and such is recommended as a practice. Perfect lags were found across the modalities that enable a universal constant to be applied in preprocessing. These are 0.56 secs (1605a) for multispectral/video color data and 0.7 secs (1605b) for thermal/video color data as shown in FIG. 16A and FIG. 16B, respectively. As shown in FIGS. 16A-B, disclosed below, there are a few, very random instances, where temporal alignment is imperfect (determined by visual inspection), which may lead to an overall slight reduction in AP and a few false positives.

FIG. 16A and FIG. 16B are graph 1600-A and 1600-B, respectively, of example embodiments of timestamp shift versus projection network loss. Such graphs show the amount video color timestamps are shifted (1607a, 1607b) versus the loss of the projection network (1609a, 1609b) used to determine temporal misalignment shifts. A value of 0 on the x axis is the performance obtained when using timestamps with no adjustments.

Model Weights

Two sets of weights were used when initializing the models-'imageNet' and 'pretrained.' The 'imageNet' weights are pretrained on the imageNet dataset and by transfer learning used by the Faster RCNN with FPN architecture (Russakovsky, et al., "ImageNet Large Scale Visual Recognition Challenge," Jan. 30, 2015, Retrieved from arXiv: 1409.0575v3). The imageNet dataset provides a NN backbone with a starting point to pick out key features in the input images. These key features are, however, specific to the classes within the imageNet dataset and should be refined for the models. The weights discovered in the 'pretrained' trials are taken from the best individual modality runs, disclosed in the table 1700 of FIG. 17, which incorporate 'imageNet' pretrained weights that are adept at detecting and classifying images of drones within their respective modality space.

FIG. 17 is a table 1700 with example embodiments of results of pretrained trials. The boldfaced F-scores (1711a, 1711b, 1711c) are used to select starting points for each modality branch. The performance of each run is ranked using the F1 score (recall the F-score is a measure that links together AP and AR). To provide the best starting point for an example embodiment of the fusion model disclosed herein, the final weights from the best individual modality runs for each modality branch were used within the fusion model. This enhanced starting point enables the fusion model to immediately produce accurate proposals within each modality, leading to a faster convergence in loss and a faster training time as shown in FIGS. 18A-B, disclosed below.

Fusion Results

FIG. 18A is a table 1800-A with example embodiments of evaluation results within output modality spaces. The table 1800-A includes evaluation results (1813-A, 1815-A, 1817-A) for all runs within each output modality space, namely the video color space, thermal space, and multispectral space, respectively. As such, the table 1800-A details the results 1813-A, 1815-A, and 1817-A, as: 1) results within the video color output space; 2) results within the thermal output space; and 3) results within the multispectral output space, respectively.

FIG. 18B is a table 1800-B with example embodiments of the best performing fusion model results (1813-B, 1815-B, 1817-B). In the tables 1800-A and 1800-B of FIG. 18A and FIG. B, respectively, "AP" is the average precision (AP) averaged over an IoU range from 0.50 to 0.90. A higher value of AP indicates fewer false positives. "AP50" is the average precision with an IoU of 0.50. "AP75" is the average precision with an IoU of 0.75. "AR" is the average recall with a max of 100 detections. Higher AR values indicate better detection. F1 it the F-Score, namely 2*((AP*AR)/(AP+AR))—higher value means as recall increases, AP stays high. In the table 1800-B of FIG. 18B, the inference time is noted as "s/img," that is, the inference time spent per image. A lower s/img value means quicker inference.

The table 1800-B lists each output modality space, where the individual modality model results are shown alongside the best performing fusion model results and the imageNet counterpart. Since an example embodiment of the fusion model produces bounding boxes for all input modality spaces, if the model uses video color and thermal images only, the output bounding boxes are displayed for both video color and thermal space. Considering this, the table 1800-B provides the evaluation results for the individual modality model and the best performing 'pretrained' fusion combination model, including the corresponding 'imageNet' model for comparison.

Results show the fusion model outperforms the individual modality model in all evaluation metric categories and all output modality spaces, including fewer false positives. The best combination of modalities to view output bounding boxes in video color space is video color and thermal; in thermal space, it is thermal and multispectral; and in multispectral space, the best combination of modalities is multispectral and thermal as disclosed in FIG. 18B. For current training data, the overall best results use thermal and multispectral images and view in thermal output space. While true for a Phase 1 prototype, during which methods are firmly established, it is recommended that future Phase 2 collection campaigns incorporate more types of drones with greater environmental variance, seasonal and night-time, before this fusion combination is adopted as a fixed template. Finally, the 'pretrained' weights model outperformed the 'imageNet' weights model throughout, as shown in FIG. 19.

Figure 19:
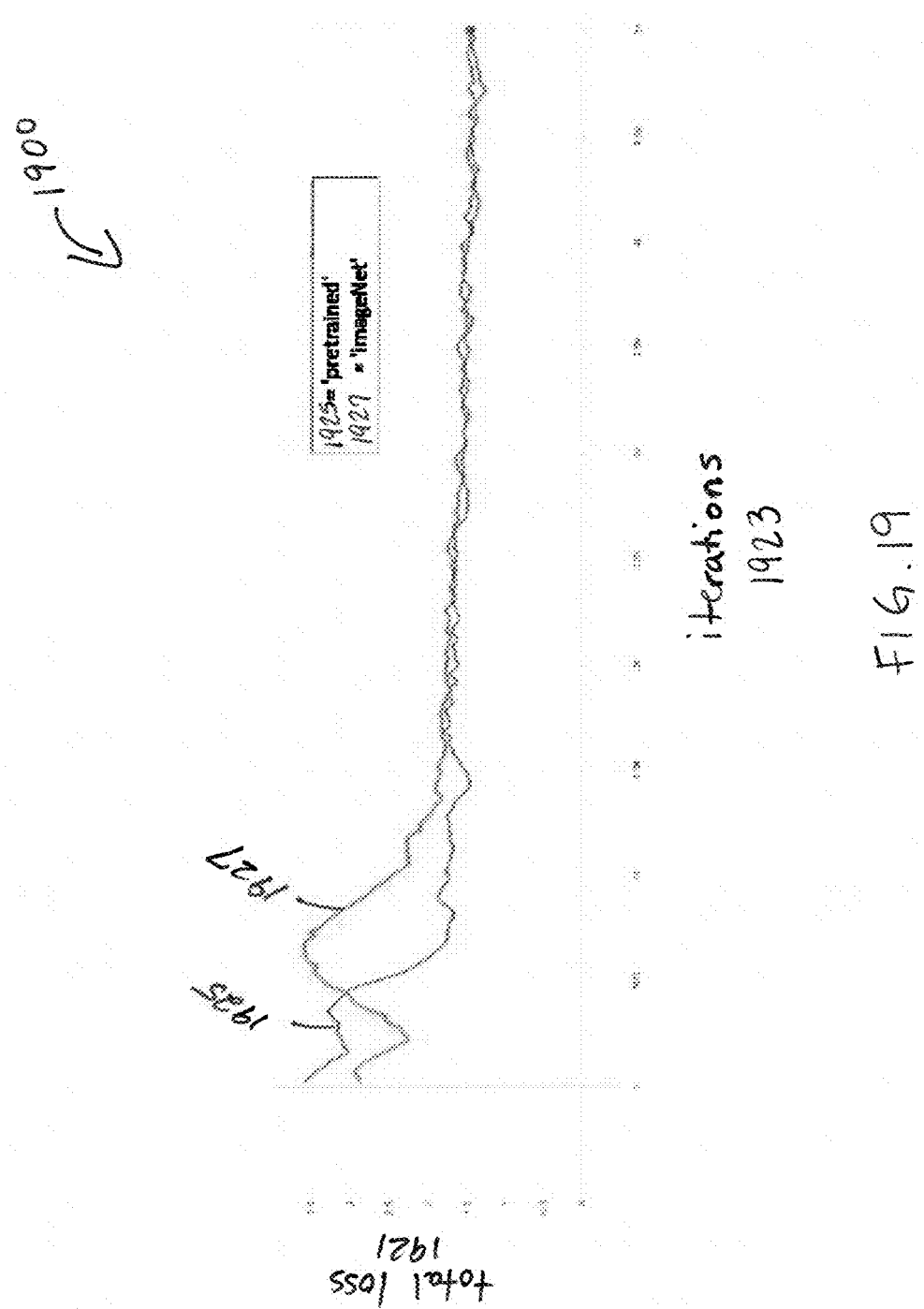
FIG. 19 is graph of an example embodiment of total loss for a fusion model trained with pretrained weights and ImageNet weights.

FIG. 19 is graph 1900 of an example embodiment of total loss 1921 for a fusion model trained with pretrained weights 1925 and ImageNet weights 1927 on video color, thermal, and multispectral images for a number of iterations 1923, namely 5 k iterations. As noted above, the pretrained weights 1925 outperformed the ImageNet weights 1927. Such would be expected since the fusion model is initialized with a backbone that accurately detects key features of drones. In turn, associated RPNs become adept at making accurate proposals, resulting in fewer iterations needed to find the best backbone and RPN weights. Consequently, the fusion model trains with better proposals, producing higher evaluation metrics and reducing the overall training time as the total loss converges more quickly (FIG. 18A and FIG. 19). Examples of prediction improvement through information sharing and fusion are offered in FIGS. 20A-1-1 through 20A-1-3; FIGS. 20A-2-1 through 20A-2-3; FIGS. 20B-1-1 through 20B-1-3; and FIGS. 20B-2-1 through 20B-2-3, disclosed below.

Figures 2, 3, 20A:
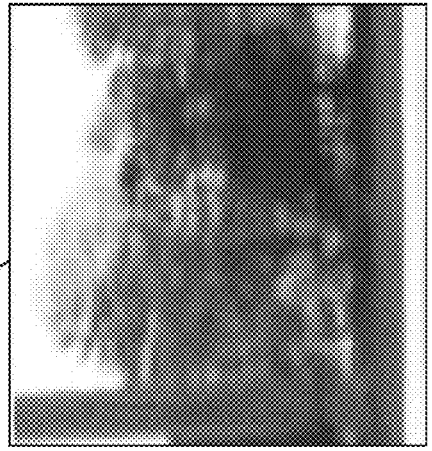
Figures 1, 2, 20A:
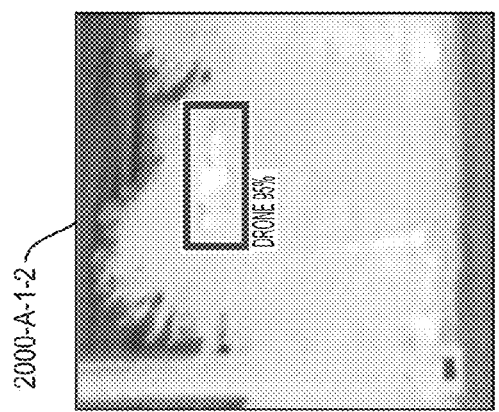
Figures 2, 20A:
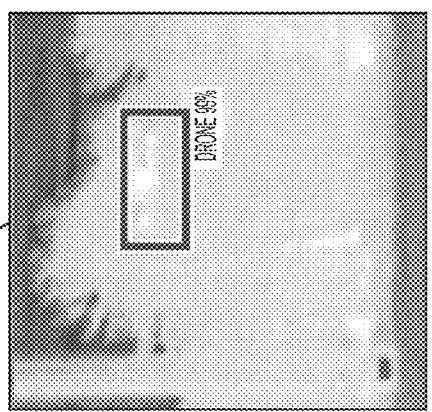
Figures 1, 20A:
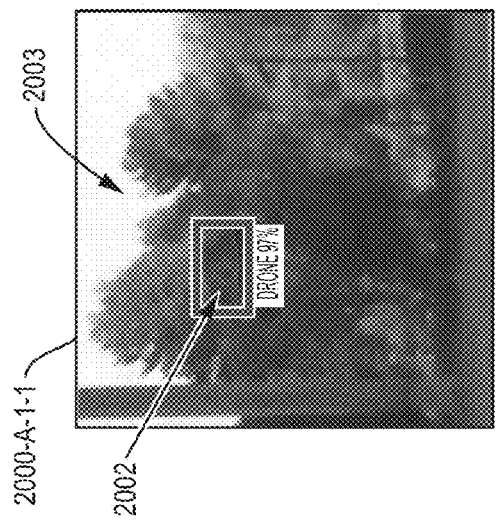
Figures 3, 20A:
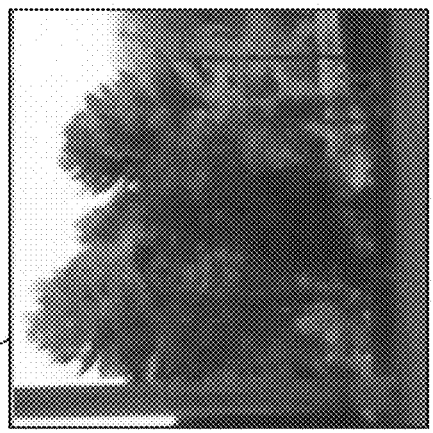

FIGS. 20A-1-1 through 20A-1-3 and FIGS. 20A-2-1 through 20A-2-3 show example outputs of the fusion model trained with video color, thermal, and multispectral images, and the outputs from each modality's individual modality model. Specifically, FIG. 20A-1-1 and FIG. 20A-2-1 are video color images 2000A-1-1 and 2000A-2-1, respectively. FIG. 20A-1-2 and FIG. 20A-2-2 are thermal images 2000A-1-2 and 2000A-2-2, respectively. FIG. 20A-1-3 and FIG. 20A-2-3 are multispectral images 2000A-1-3 and 2000A-2-3, respectively.

FIGS. 20A-1-1 through 20A-1-3 show the outputs from the fusion model where such outputs show drone prediction in all modalities from cumulative information sharing. FIGS. 20A-2-1 through 20A-2-3 show the outputs from each modality's individual modality model. FIGS. 20A-2-1 through 20A-2-3 show the drone is only predicted in the thermal modality in single modality.

With reference to FIG. 20A-1-1, in the original image (2000A-1-1), the drone 2002 is hidden in front of the background vegetation 2003. Due to the location of the drone, the thermal individual modality model can accurately detect the drone as shown in the thermal image FIG. 2000A-2-2 while the video color and multispectral models cannot, as shown in the video color image 2000A-2-1 and multispectral image 2000-A-3.

The results of the fusion model show that, even though the video color and multispectral individual modality models cannot detect the drone individually, they are able to use information from the thermal sensor to accurately detect the drone in their own specific modality spaces with high confidence, as disclosed below with regard to FIGS. 20B-1-1 through 20B-1-3 and FIGS. 20B-2-1 through 20B-2-3.

Figures 1, 3, 20B:
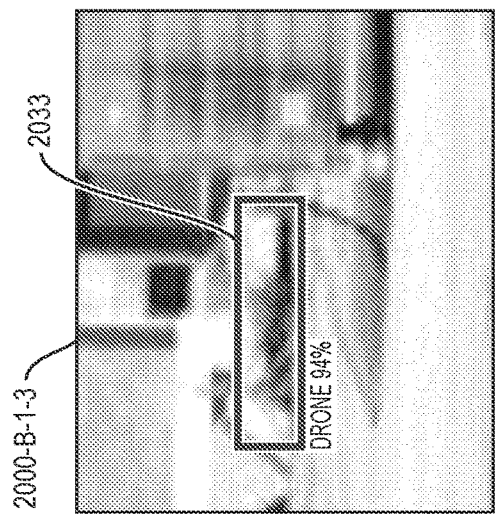
Figures 2, 3, 20B:
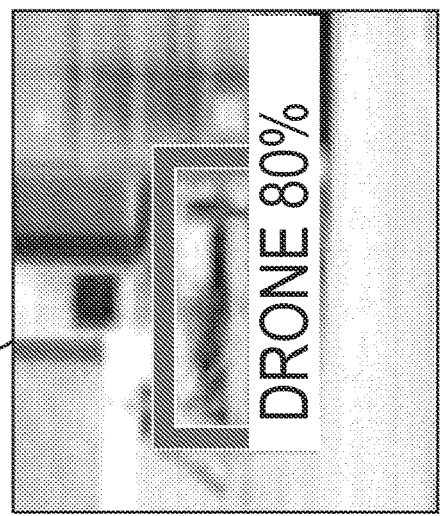
Figures 1, 2, 20B:
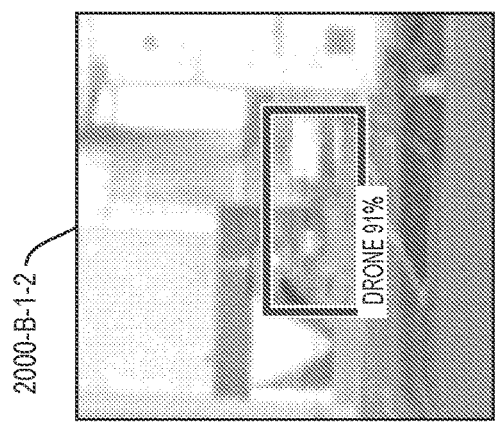
Figures 2, 20B:
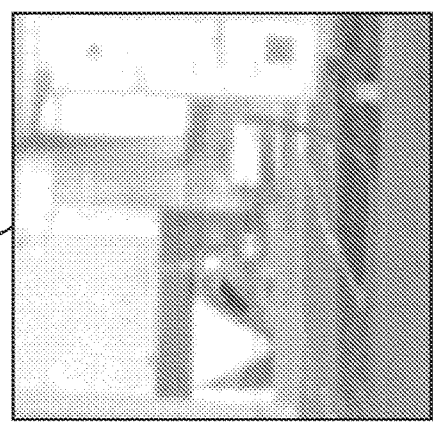
Figures 1, 20B:
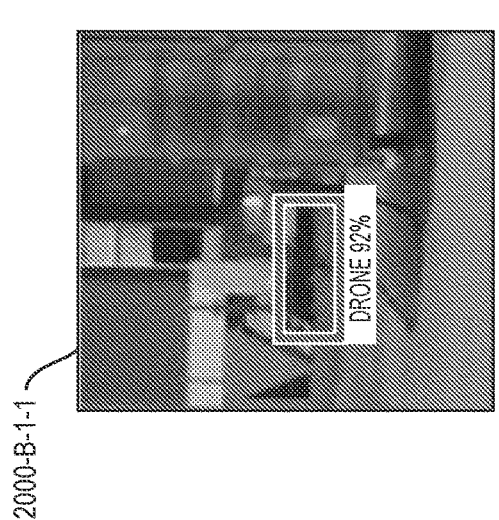
Figures 1, 2, 20B:
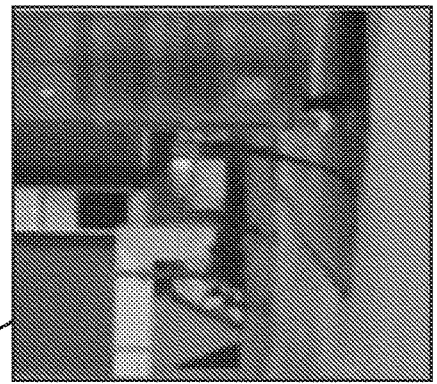

FIGS. 20B-1-1 through 20B-1-3 and FIGS. 20B-2-1 through 20B-2-3 illustrate the multispectral individual modality model detects a drone in front of the building, while the other two modalities cannot not. FIG. 20B-1-1 and FIG. 20B-2-1 are video color images 2000B-1-1 and 2000B-2-1, respectively. FIG. 20B-1-2 and FIG. 20B-2-2 are thermal images 2000B-1-2 and 2000B-2-2, respectively. FIG. 20B-1-3 and FIG. 20B-2-3 are multispectral images 2000B-1-3 and 2000B-2-3, respectively.

FIGS. 20B-1-1 through 20B-1-3 show the outputs from the fusion model where such outputs show drone prediction in all modalities from cumulative information sharing. FIGS. 20B-2-1 through 20B-2-3 show the outputs from each modality's individual modality model.

FIGS. 20B-2-1 through 20B-2-3 show the drone is only predicted in multispectral in single modality. As shown by way of the bounding box 2033 in the multispectral image 2000B-2-3, the multispectral individual modality model detects the drone. Since multispectral detects the drone, the fusion model accurately places a bounding box around the drone in the video color and thermal output spaces as well as shown in the video color image 2000-B-1-1 and thermal image 2000-B-1-2. Finally, FIGS. 20C-1-1 through FIGS. 20C-1-3 and 20C-2-1 through 20C-2-3, show that no individual modality model confidently predicts the drone's location, although cumulatively they can, as disclosed below.

Figures 1, 3, 20C:
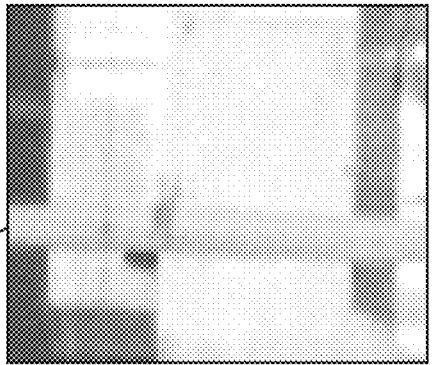
Figures 2, 3, 20C:
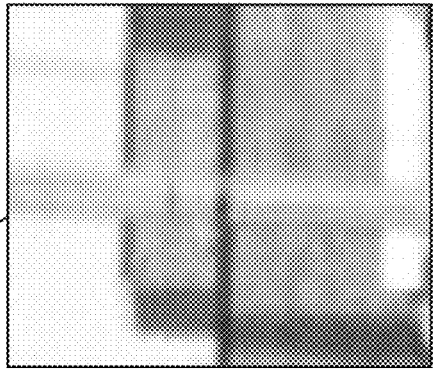
Figures 1, 2, 20C:
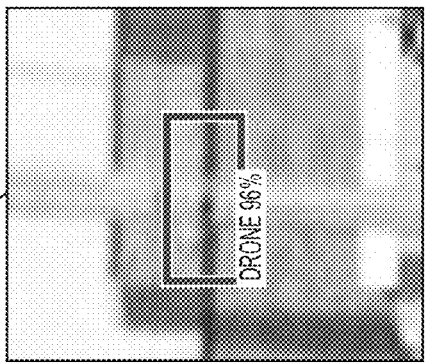
Figures 2, 20C:
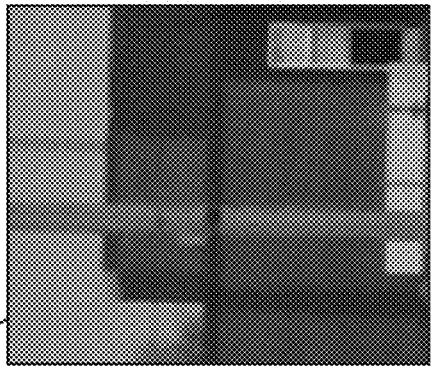
Figures 1, 20C:
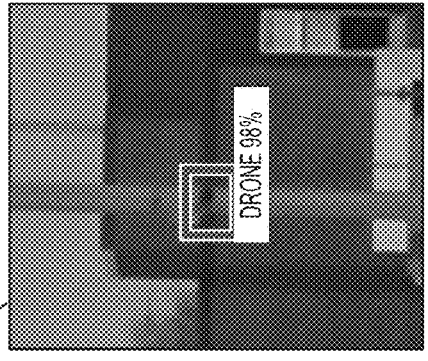
Figures 1, 2, 20C:
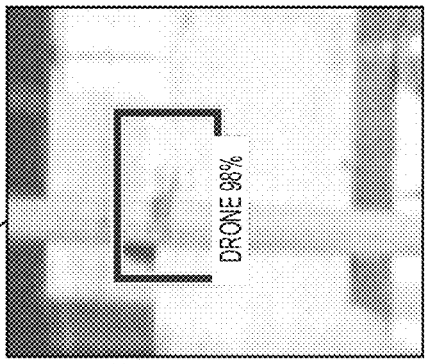

FIGS. 20C-1-1 through 20C-1-3 and FIGS. 20C-2-1 through 20C-2-3 show example outputs of the fusion model trained with video color, thermal, and multispectral images, and the outputs from each modality's individual modality model. Specifically, FIG. 20C-1-1 and FIG. 20C-2-1 are video color images 2000C-1-1 and 2000C-2-1, respectively. FIG. 20C-1-2 and FIG. 20C-2-2 are thermal images 2000C-1-2 and 2000C-2-2, respectively. FIG. 20C-1-3 and FIG. 20C-2-3 are multispectral images 2000C-1-3 and 2000C-2-3, respectively.

FIGS. 20C-1-1 through 20C-1-3 show the outputs from the fusion model where such outputs show drone prediction in all modalities from cumulative information sharing. FIGS. 20C-2-1 through 20C-2-3 show the outputs from each modality's individual modality model. FIGS. 20C-2-1 through 20C-2-3 show no drone predicted from single modalities alone.

CONCLUSIONS

The key to machine learning and AI success is clean, sanitized training data that appropriately trains a computer method to extract relevant information from massive input data. Understanding data collection strategies, data curation needs, and data engineering (from data diversity to meta data) guides the acquisition of high-quality training data toward a purpose-built platform. When sensor development, data collection campaigns. and analytics are independent, deep learning and fusion approaches are not tested empirically and solving the fundamental fusion problem becomes more theoretical and less practical. New multimodal methods disclosed herein are not conceived from silo'd derivatives. Rather, they are developed iteratively, ultimately fusing 8 modes of information (video, thermal and 6 bands of multispectral data). An example embodiment disclosed herein challenges the status quo in ways that introduce multimodality and enable information sharing between multiple networks using a new projection function. The result is rapid and distinguishable high-performance AI fusion, capable of day and night-time detection.

An example embodiment disclosed herein proves value of fusing multiple modes of data using a novel Multi-Modal Region Proposal Network (MMRPN) by providing reduced false positive rates over single modality detections. Metrics disclosed herein also reveal the novel fusion model outperforms individual modality models, in all evaluation metrics, for each modality, and that pretrained fusion models outperform the imageNet pretrained fusion models.

There are other examples that demonstrate the benefits of MMRPN fusion. For instance, in some cases the video color and multispectral individual modality models cannot detect a drone in front of trees, while the thermal model can, allowing the fusion model to accurately detect this drone with a high confidence across all modalities. Or, on occasion, individual modality models lack confidence to make a prediction although cumulatively prediction is possible. Another case scenario is at nighttime. Since video color is dependent on sunlight, detection is ineffective in the dark. The thermal sensor, on the other hand, only requires a temperature contrast to enable detection and, thus, is effective for both day- and night-time sensing. By combining information from both sensors, the MMRPN can ignore an absence of information in video color at night and utilize confident information provided by thermal data to make a positive prediction. As such, an example embodiment of a novel MMRPN method disclosed herein successfully shares information between modalities during runtime and maximizes the benefits of multi-modality through synergistic and beneficial learning.

An example embodiment may be adapted to other 1D and 3D tensors to provide semi-automated intelligence and fidelity knowledge, such as disclosed below with regard to FIG. 21. For example, middle fusion may be use such modes as Software Defined Radio (SD) and/or, radio detection and ranging (RADAR). It is theoretically plausible if time stamp information is used to constrain detection. Additional training data to add more SUAS models (training), more robust collects with more object classes and incorporate further environmental variance is also recommended applying the methods disclosed herein. An example embodiment of a model disclosed herein may be further developed using edge computing in distributed environments to bring computation and data storage closer to the location where it is needed. This improves response times, saves bandwidth, and prepares the models for extended system fusion, integration, and collaboration with other systems.

Figure 21:
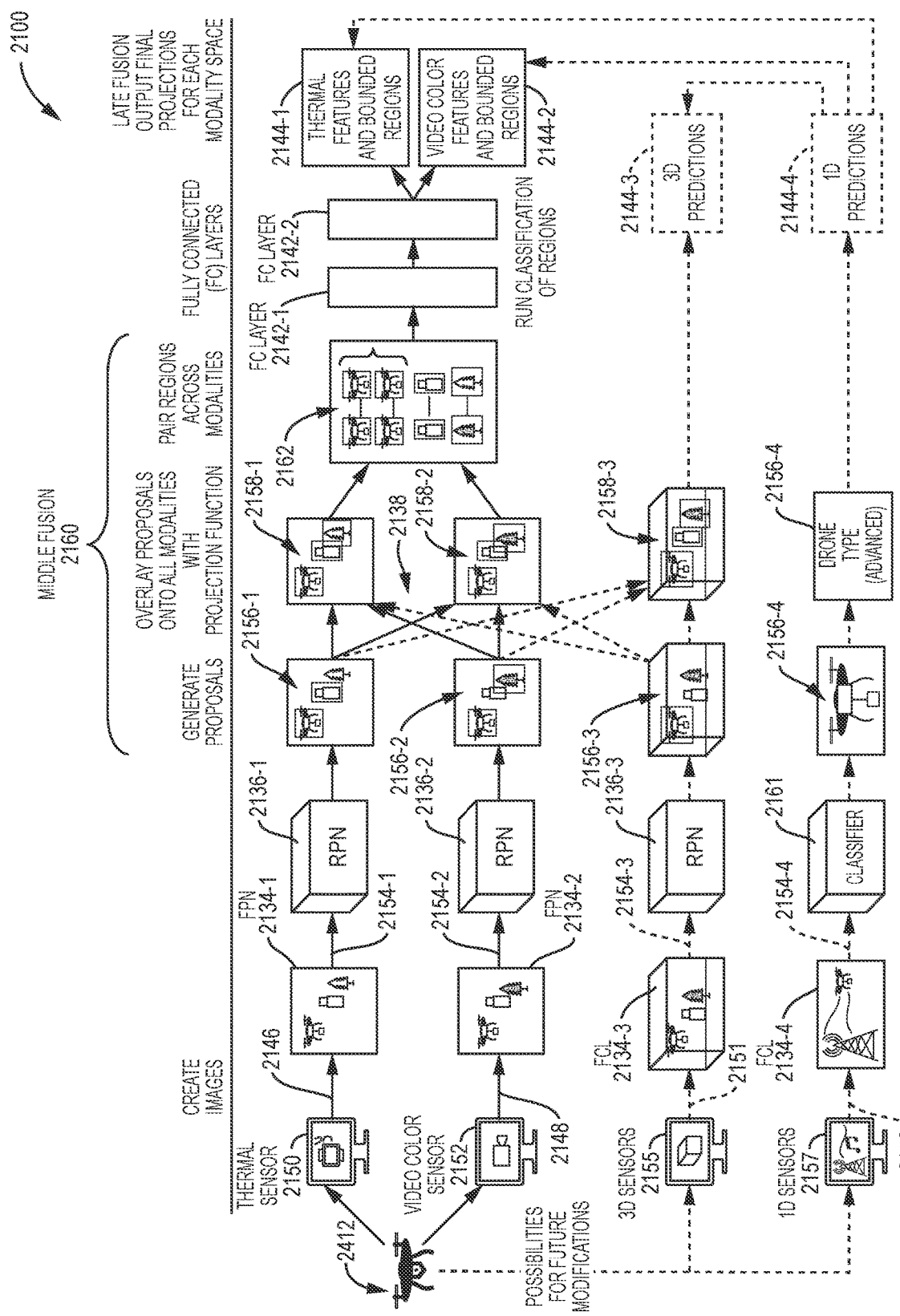
FIG. 21 is a schematic diagram of an example embodiment of another multi-model fusion model architecture that may be used to perform methods disclosed herein.

FIG. 21 is a schematic diagram of an example embodiment of a MMRPN 2100 architecture that may be used to perform methods disclosed herein with other tensor modalities. In the architecture 2100, the lower neural net's feature pyramid networks (FPNs), namely the FPN 2134-1 and FPN 2134-2 each extract features from one modality. For example, the FPN 2134-1 extracts features from thermal data 2146 collected via a thermal sensor 2150 of a multi-modal system 2112 while the FPN 2134-2 extracts features from video color data 2146 collected via a video color sensor 2152 of the multi-modal system 2112. The fully connected layers (FCL) 2134-3 extract features from 3D tensor data 2151 collected via 3D tensors 2155 of the multi-modal system 2112 and the FCL 2134-4 extract features from 1D tensor data 2159 collected via 1D sensors 2157 of the multi-modal system 2112.

The FPN 2134-1, FPN 2134-2, and FPN 2134-3) pass respective feature maps (2154-1, 2154-2, 2154-3) to a respective RPN (2136-1, 2136-2, 2136-3). The RPNs identify respective potential regions of interest (2156-1, 2156-2, 2156-3) (proposals) within the respective feature map (2154-1, 2154-2, 2153) received. A new projection function 2138 for projection projects such modality specific proposals into other modality spaces to create a proposal set for each modality (2158-1, 2158-2, 2158-3). Each proposal set is a collection of the thermal, video color, and 3D tensor proposals in the non-limiting example of FIG. 21.

Such thermal, video color, and 3D tensor modalities incorporate some overlapping field of view. Spatial misalignment is expected and corrected through the projection function 2138. The middle fusion section 2160 may be referred to as a Multi-Modal RPN (MMRPN) and aligns the corresponding proposals by pairing 2162 regions across the thermal, video color, and 3D tensor modalities. The architecture 600 further includes a fully connected (FC) network including FC layers (2142-1, 2142-2) for synthesizing the thermal and video color predictions, namely the thermal output 2144-1 with thermal features and corresponding bounded regions and the video color output 2144-2 with video color features and corresponding bounded regions.

In the example embodiment, the proposal set 2158-3 may be output directly as the 3D predictions 2144-3. The respective feature map 2154-4 output for the 1D sensor modality may be input to a classifier 2161 that may produce a proposal 2154-4 classifying a type 2164-4 of drone in the FOV and the type 2164-4 may be output as a 1D prediction 2144-4 that may be included in the thermal output 2144-1, video color output 2144-2, and 3D predictions 2144-3 for non-limiting example.

Example Features

A non-limiting list of example features disclosed herein includes:

1. Synchronized collection of data using >1 modality using in-house facilities. An experimental approach means it is possible to determine if the correct task is being solved before expanding the size of our dataset or knowing what the next collection needs to look like, even beneficial sensor upgrades. This example approach enables our computer models to be transparent and learn cleanly.

2. Innovative method (i.e., computer-implemented method) implementation for object detection may be employed.

3. Designed with containerization in mind so fusion methods can be extensible. Play and plug approaches allow competition as a part of a software-enabled force grounded in firm data science principles. Design is not standalone.

Example Advantages

A non-limiting list of example advantages of an example embodiment disclosed herein includes:

1. New methods are adaptable to other 2D, 3D and 4D data to provide semi-automated intelligence and fidelity knowledge.

2. Methods are extensible with operation close to near real time.

3. Play and plug approaches with goals to become a part of a software-enabled force grounded in firm data science principles.

4. By leveraging multiple sensor sources in an orchestrated fashion, we have adapted open-source AI methods and challenged their status quo in ways that improve synergistic information sharing in our neural nets that improve model performance.

5. Multimodal fusion improves model performance accuracies AND introduce day and night-time capability, with potential for all weather conditions-whereas single modalities have limited environmental operability, e.g., either day or night, etc.

Example Products and Services

A non-limiting list of example products and services that may employ and example embodiment disclosed herein includes:

1. Detecting, tracking and identifying moving objects of interest (in sky or on ground).

2. Potentially detect elicit behavior either by tracking objects that become occluded; or distinguishing between types of moving objects.

3. Establish value of information of a method(s) for, e.g., to support tactical scale planning and operations for varied environments, including: densely vegetated tropical landscapes (RADAR, LiDAR can map beneath the canopy of trees), densely populated areas in central Europe and East Asia (difficult b/c of obfuscation), and cold (i.e., sub-arctic and arctic) regions throughout northern Europe and Asia.

4. Use architecture to evaluate legitimacy of chain of custody of data.

Example Applications

A counter drone is a non-limiting example.

Example Uses

A non-limiting list of example uses for an example embodiment disclosed herein includes:

1. Armed Force installation and critical infrastructure, sensitive buildings, facilities (including sports stadiums) and personnel protection: off-the-shelf drones are readily available making it easy for adversaries to weaponize them.

2. Adaptation to other moving options in the sky (DoD), e.g., https://www.c4isrnet.com/battlefield-tech/space/2020/04/28/the-space-forces-next-missile-warning-satellite-is-one-step-closer-to-2021-launch/.

3. Support tactical scale planning and operations for varied environments, e.g., moving cars in dense urban environments where detection is a complex task affected by many variables, such as weather, lighting, shadows from buildings.

4. Counter UAS to detect the presence of hostile or unauthorized UAS.

5. Detect, track and identify moving objects of interest.

6. Potentially detect elicit behavior either by tracking objects that become occluded; or distinguishing between types of moving objects.

Figure 22:
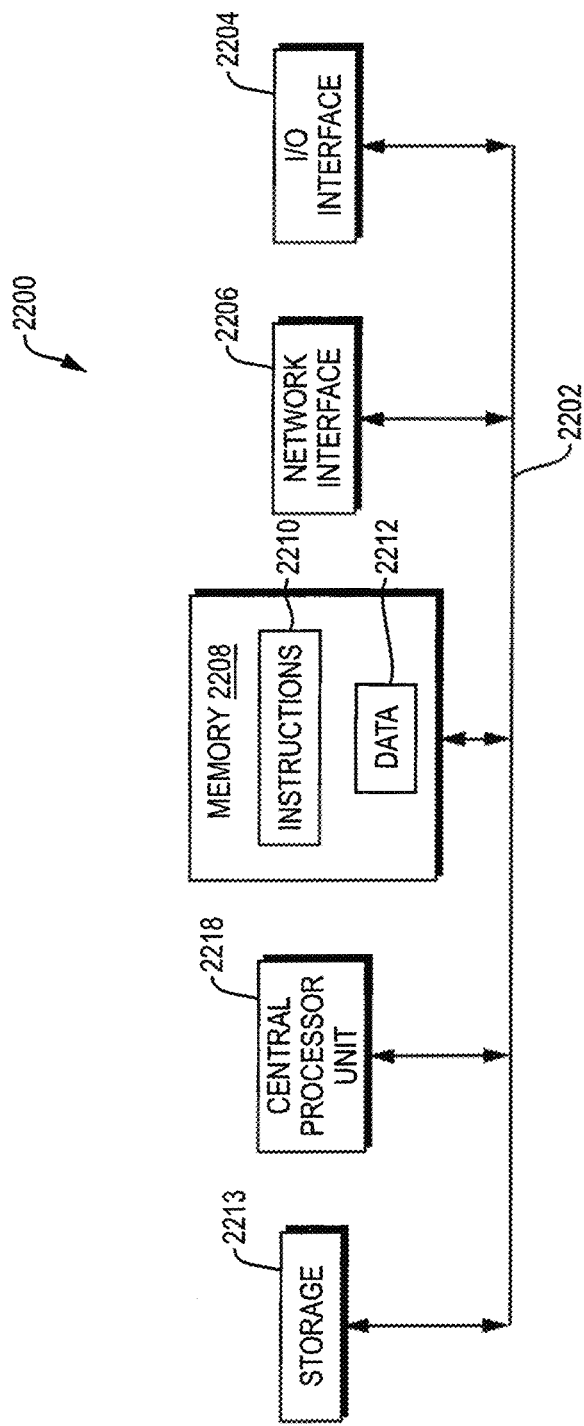
FIG. 22 is a block diagram of an example of the internal structure of a computer in which various embodiments of the present disclosure may be implemented.

FIG. 22 is a block diagram of an example of the internal structure of a computer 2200 in which various embodiments of the present disclosure may be implemented. The computer 2200 contains a system bus 2202, where a bus is a set of hardware lines used for data transfer among the components of a computer or digital processing system. The system bus 2202 is essentially a shared conduit that connects different elements of a computer system (e.g., processor, disk storage, memory, input/output ports, network ports, etc.) that enables the transfer of information between the elements. Coupled to the system bus 2202 is an I/O device interface 2204 for connecting various input and output devices (e.g., keyboard, mouse, display monitors, printers, speakers, microphone, etc.) to the computer 2200. A network interface 2206 allows the computer 2200 to connect to various other devices attached to a network (e.g., global computer network, wide area network, local area network, etc.). Memory 2208 provides volatile or non-volatile storage for computer software instructions 2210 and data 2212 that may be used to implement embodiments (e.g., method 400) of the present disclosure, where the volatile and non-volatile memories are examples of non-transitory media. Disk storage 2213 also provides non-volatile storage for the computer software instructions 2210 and data 2212 that may be used to implement embodiments (e.g., method 400) of the present disclosure. A central processor unit 2218 is also coupled to the system bus 2202 and provides for the execution of computer instructions.

Further example embodiments disclosed herein may be configured using a computer program product; for example, controls may be programmed in software for implementing example embodiments. Further example embodiments may include a non-transitory computer-readable-medium that contains instructions that may be executed by a processor, and, when loaded and executed, cause the processor to complete methods and techniques described herein. It should be understood that elements of the block and flow diagrams may be implemented in software or hardware, such as via one or more arrangements of circuitry of FIG. 22, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for operating a system observing a feature in a scene, the computer-implemented method comprising:

predicting existence of the feature in the scene for each of at least two modes of observation of the scene, the predicting performed by calculating a proposal of the existence of the feature within a respective bounded region of a representation of the scene for each of the at least two modes of each observation of a sequence of observations;

overlaying the proposal of the existence of the feature within the respective bounded region for each of the at least two modes by using a projection function that shares information between or among modes to generate a corresponding fused predicted existence of the feature for each of the at least two modes of each observation; and updating parameters used for operating the system, the parameters updated based on each observation of the sequence of observations as a function of: (i) the predicted existence of the feature for at least one mode of the at least two modes, (ii) the corresponding fused predicted existence of the feature for the at least two modes, or (iii) a combination of (i) and (ii).

2. The computer-implemented method of claim 1, wherein using the projection function includes spatially aligning corresponding proposals for the existence of the feature in the at least two modes to convert coordinates from one mode to another mode, thereby aligning the respective bounded region of each of the at least two modes.

3. The computer-implemented method of claim 1, wherein calculating the proposal of the feature includes, for each of the at least two modes, using a region proposal network (RPN) to generate proposals then learning a corresponding probability of the feature within the respective bounded regions.

4. The computer-implemented method of claim 3, wherein the computer-implemented method further comprises:
  placing predetermined control points at pixel positions within the respective bounded region of each of the at least two modes;
  generating deltas between corresponding control points of the respective bounded regions; and
  wherein the overlaying is performed as a function of the deltas generated to align the proposals and wherein the overlaying includes fusing the aligned proposals to enable information sharing, via the projection function, between or among the at least two modes.

5. The computer-implemented method of claim 1, wherein predicting the existence of the feature in the representation of the scene includes using a faster region-based convolutional neural network including a feature pyramid network (FPN), RPN, and final prediction network, and wherein the computer-implemented method further comprises:
  extracting features in the scene by applying the FPN to the sequence of observations;
  identifying potential regions of interest by applying the RPN to the features extracted;
  generating the respective bounded region for the potential regions identified; and
  fusing outputs for a given mode of the at least two modes, the fusing including using the projection function to guide fusion of bounded regions of the other of the at least two modes onto the bounded region of the given mode.

6. The computer-implemented method of claim 1, further comprising implementing the at least two modes of observation by acquiring data continuously from at least two sensors.

7. The computer-implemented method of claim 6, wherein the at least two sensors are from a group of sensors including: a multi-spectral sensor, video sensor, thermal sensor, or other modality-specific sensor.

8. The computer-implemented method of claim 6, wherein each observation is a respective frame of data from the data acquired and wherein the computer-implemented method further comprises generating the sequence of observations from a plurality of consecutive, continuously collected frames of the data acquired.

9. The computer-implemented method of claim 6, further comprising performing temporal matching of the data acquired from the at least two sensors.

10. The computer-implemented method of claim 1, wherein the feature is an object and wherein the operating includes:
  notifying another system of fusion performance associated with a given mode of the at least two modes, the fusion performance representing utility of the given mode for observing the feature in the scene;
  notifying another system of the existence of the object via a wired or wireless communications path; or
  a combination thereof.

11. The computer-implemented method of claim 1, further comprising:
  changing a total number of the at least two modes, the total number changed based on fusion performance of a given mode of the at least two modes.

12. A system comprising:
  a prediction module configured to predict existence of a feature in a scene, for each of at least two modes of observation of the scene, calculating a proposal of the existence of the feature within a respective bounded region of a representation of the scene for each of the at least two modes of each observation of a sequence of observations;
  an overlay module configured to overlay the proposal of the existence of the feature within the respective bounded region for each of the at least two modes by using a projection function that shares information between or among modes to generate a corresponding fused predicted existence of the feature for each of the at least two modes of each observation; and
  a controller configured to operate the system based on parameters, the controller further configured to update the parameters based on each observation of the sequence of observations as a function of: (i) the predicted existence of the feature for at least one mode of the at least two modes, (ii) the corresponding fused predicted existence of the feature for the at least two modes, or (iii) a combination of (i) and (ii).

13. The system of claim 12, wherein using the projection function includes spatially aligning corresponding proposals for the existence of the feature in the at least two modes to convert coordinates from one mode to another mode, thereby aligning the respective bounded region of each of the at least two modes.

14. The system of claim 12, wherein, to calculate the proposal of the feature, the prediction module is further configured, for each of the at least two modes, to use a region proposal network (RPN) to generate proposals and then learn a corresponding probability of the feature within the respective bounded regions.

15. The system of claim 14, wherein the overlay module is further configured to:
  place predetermined control points at pixel positions within the respective bounded region of each of the at least two modes;
  generate deltas between corresponding control points of the respective bounded regions; and
  overlay the proposal of the existence as a function of the deltas generated to align the proposals and fuse the aligned proposals to enable information sharing, via the projection function, between or among the at least two modes.

16. The system of claim 12, wherein the prediction module is further configured to:
  predict the existence of the feature in the representation of the scene using a faster region-based convolutional neural network including a feature pyramid network (FPN), RPN, and final prediction network;
  extract features in the scene by applying the FPN to the sequence of observations;
  identify potential regions of interest by applying the RPN to the features extracted;
  generate the respective bounded region for the potential regions identified; and
  fuse outputs for a given mode of the at least two modes using the projection function to guide fusion of bounded regions of the other of the at least two modes onto the bounded region of the given mode.

17. The system of claim 12, wherein the prediction module is further configured to acquire data continuously from at least two sensors thereby implementing the at least two modes of observation.

18. The system of claim 17, wherein the at least two sensors are from a group of sensors including: a multispectral sensor, video sensor, thermal sensor, or other modality-specific sensor.

19. The system of claim 17, wherein each observation is a respective frame of data from the data acquired and wherein the prediction module is further configured to generate the sequence of observations from a plurality of consecutive, continuously collected frames of the data acquired.

20. The system of claim 17, wherein the predication module is further configured to perform temporal matching of the data acquired from the at least two sensors.

21. The system of claim 12, wherein the feature is an object and wherein the controller is further configured to:
notify another system of fusion performance associated with a given mode of the at least two modes, the fusion performance representing utility of the given mode for observing the feature in the scene;
notify another system of the existence of the object via a wired or wireless communications path; or
a combination thereof.

22. The system of claim 12, wherein the controller is further configured to:
change a total number of the at least two modes, the total number changed based on fusion performance of a given mode of the at least two modes.

23. The system of claim 12, wherein the prediction module, overlay module, and controller are trained based on a training dataset, the training dataset including training data acquired from the at least two sensors, the training data including the feature in a plurality of scenes, the plurality of scenes associated with a plurality of different environments and different conditions.

24. A non-transitory computer-readable medium for operating a system observing a feature in a scene, the non-transitory computer-readable medium having encoded thereon a sequence of instructions which, when loaded and executed by at least one processor, causes the at least one processor to:
predict existence of the feature in the scene, for each of at least two modes of observation of the scene, by calculating a proposal of the existence of the feature within a respective bounded region of a representation of the scene for each of the at least two modes of each observation of a sequence of observations;
overlay the proposal of the existence of the feature within the respective bounded region for each of the at least two modes by using a projection function that shares information between or among modes to generate a corresponding fused predicted existence of the feature for each of the at least two modes of each observation; and
update parameters used for operating the system, the parameters updated based on each observation of the sequence of observations as a function of: (i) the predicted existence of the feature for at least one mode of the at least two modes, (ii) the corresponding fused predicted existence of the feature for the at least two modes, or (iii) a combination of (i) and (ii).

* * * * *